US012754712B2

(12) United States Patent
Li et al.

(10) Patent No.: US 12,754,712 B2
(45) Date of Patent: Oct. 6, 2026

(54) FLOATING-POINT MULTIPLICATION UNIT AND FLOATING POINT PHOTONIC TENSOR ACCELERATOR

(71) Applicant: University of Central Florida Research Foundation, Inc., Orlando, FL (US)

(72) Inventors: Guifang Li, Orlando, FL (US); Sean Pang, Orlando, FL (US)

(73) Assignee: University of Central Florida Research Foundaton, Inc, Orlando, FL (US)

( * ) Notice: Subject to any disclaimer, the term of this patent is extended or adjusted under 35 U.S.C. 154(b) by 209 days.

(21) Appl. No.: 18/615,208

(22) Filed: Mar. 25, 2024

(65) Prior Publication Data

US 2024/0311081 A1 Sep. 19, 2024

(51) Int. Cl.
*G06F 7/487* (2006.01)

(52) U.S. Cl.
CPC .................................. *G06F 7/4876* (2013.01)

(58) Field of Classification Search
CPC ........ G06F 7/4876; G06F 7/487; G06F 7/483; G06N 3/02; G06N 3/04; G06N 3/067; G06N 3/0675; G06E 3/00; G06E 3/001; G06E 3/008
USPC ................ 359/107; 708/800, 813, 816, 835; 712/220, 222, 221; 706/15, 27, 38, 40
See application file for complete search history.

(56) References Cited

U.S. PATENT DOCUMENTS

| | | | | |
|---|---|---|---|---|
| 10,481,869 | B1 * | 11/2019 | Wang | G06F 7/487 |
| 2017/0293470 | A1 * | 10/2017 | Wang | G06F 7/5443 |
| 2020/0142441 | A1 * | 5/2020 | Bunandar | G06E 3/008 |

FOREIGN PATENT DOCUMENTS

| | | | | |
|---|---|---|---|---|
| TW | 202220401 A | * | 5/2022 | H04J 14/0307 |
| WO | WO-2020103615 A1 | * | 5/2020 | G06E 3/005 |

OTHER PUBLICATIONS

K. Jain and G. W. Pratt, "Optical transistor," Appl. Phys. Lett., vol. 28, No. 12, pp. 719-721, Jun. 1976, doi: 10.1063/1.88627.

(Continued)

*Primary Examiner* — Arnel C Lavarias
(74) *Attorney, Agent, or Firm* — FLEIT Intellectual Property Law; Jon Gibbons

(57) ABSTRACT

A multiplication unit, such as a photonic multiplication unit, for multiplication of a floating point number is claimed. A first signal is produced representing an exponent of a floating point number mapped onto the frequency of a harmonic wave. A second signal is produced representing a significand of the floating point number mapped onto an amplitude of the harmonic wave to produce a floating point number. There are numerous examples of how the floating point number may be used, such as displayed, stored in a fixed, non-transitory, storage medium for later retrieval, used in a mathematical operation using cascade modulation, used in a mathematical operation using interference, used in a mathematical operation using interference with a comb filter, used in a mathematical operation using cascade operation with summation. The multiplication unit is extendable to a multiplication unit for vector, matrix or tensor multiplication using interference or beam combiner.

7 Claims, 9 Drawing Sheets

(56) References Cited

OTHER PUBLICATIONS

R. F. Rutz, "Transistor-Like Device Using Optical Coupling Between Diffused P—N Junctions in GaAs," Proc. IEEE, 1963, doi: 10.1109/PROC.1963.1854.

M. N. Islam, "Ultrafast all-optical logic gates based on soliton trapping in fibers," Opt. Lett., vol. 14, No. 22, p. 1257, Nov. 1989, doi: 10.1364/OL.14.001257.

H. F. Taylor, "Guided wave electrooptic devices for logic and computation," Appl. Opt., vol. 17, No. 10, p. 1493, May 1978, doi: 10.1364/AO.17.001493.

J. W. Goodman, "Operations Achievable with Coherent Optical Information Processing Systems," Proc. IEEE, 1977, doi: 10.1109/PROC.1977.10429.

D. A. B. Miller, "Are optical transistors the logical next step?," Nat. Photonics, vol. 4, No. 1, pp. 3-5, Jan. 2010, doi: 10.1038/nphoton.2009.240.

H. J. Caulfield and S. Dolev, "Why future supercomputing requires optics," Nat. Photonics, vol. 4, No. 5, pp. 261-263, May 2010, doi: 10.1038/nphoton.2010.94.

T. Deng, J. Robertson, and A. Hurtado, "Controlled Propagation of Spiking Dynamics in Vertical-Cavity Surface-Emitting Lasers: Towards Neuromorphic Photonic Networks," IEEE J. Sel. Top. Quantum Electron., 2017, doi: 10.1109/JSTQE.2017.2685140.

T. Ferreira de Lima, B. J. Shastri, A. N. Tait, M. A. Nahmias, and P. R. Prucnal, "Progress in neuromorphic photonics," Nanophotonics, 2017, doi: 10.1515/nanoph-2016-0139.

D. Brunner, S. Reitzenstein, and I. Fischer, "All-optical neuromorphic computing in optical networks of semiconductor lasers," in 2016 IEEE International Conference on Rebooting Computing (ICRC), IEEE, Oct. 2016, pp. 1-2. doi: 10.1109/ICRC.2016.7738705.

J. K. George et al., "Neuromorphic photonics with electro-absorption modulators," Opt. Express, vol. 27, No. 4, p. 5181, Feb. 2019, doi: 10.1364/OE.27.005181.

H. T. Peng, M. A. Nahmias, T. F. De Lima, A. N. Tait, B. J. Shastri, and P. R. Prucnal, "Neuromorphic Photonic Integrated Circuits," IEEE J. Sel. Top. Quantum Electron., 2018, doi: 10.1109/JSTQE.2018.2840448.

A. M. Andrew, "Principles of Neuromorphic Photonics," in Unconventional Computing. Encyclopedia of Complexity and Systems Science Series, 2012. doi: 10.1108/03684921211229587.

A. N. Tait et al., "Neuromorphic photonic networks using silicon photonic weight banks," Sci. Rep., 2017, doi: 10.1038/s41598-017-07754-z.

A. Dejonckheere et al., "All-optical reservoir computer based on saturation of absorption," Opt. Express, 2014, doi: 10.1364/oe.22.010868.

F. Duport, B. Schneider, A. Smerieri, M. Haelterman, and S. Massar, "All-optical reservoir computing," Opt. Express, 2012, doi: 10.1364/oe.20.022783.

A. Katumba, J. Heyvaert, B. Schneider, S. Uvin, J. Dambre, and P. Bienstman, "Low-Loss Photonic Reservoir Computing with Multimode Photonic Integrated Circuits," Sci. Rep., 2018, doi: 10.1038/s41598-018-21011-x.

K. Vandoorne et al., "Toward optical signal processing using Photonic Reservoir Computing," Opt. Express, vol. 16, No. 15, p. 11182, Jul. 2008, doi: 10.1364/OE.16.011182.

19] L. Larger, A. Baylón-Fuentes, R. Martinenghi, V. S. Udaltsov, Y. K. Chembo, and M. Jacquot, "High-speed photonic reservoir computing using a time-delay-based architecture: Million words per second classification," Phys. Rev. X, 2017, doi: 10.1103/PhysRevX.7.011015.

Y. Paquot et al., "Optoelectronic reservoir computing," Sci. Rep., 2012, doi: 10.1038/srep00287.

N. P. Jouppi et al., "In-Datacenter Performance Analysis of a Tensor Processing Unit," in Proceedings of the 44th Annual International Symposium on Computer Architecture—ISCA '17, New York, New York, USA: ACM Press, 2017, pp. 1-12. doi: 10.1145/3079856.3080246.

M. Courbariaux, Y. Bengio, and J. P. David, "Binaryconnect: Training deep neural networks with binary weights during propagations," in Advances in Neural Information Processing Systems, 2015, pp. 3123-3131.

M. Rastegari, V. Ordonez, J. Redmon, and A. Farhadi, "XNOR-Net: ImageNet Classification Using Binary Convolutional Neural Networks BT—Computer Vision—ECCV 2016," B. Leibe, J. Matas, N. Sebe, and M. Welling, Eds., Cham: Springer International Publishing, 2016, pp. 525-542.

I. Hubara, M. Courbariaux, D. Soudry, R. El-Yaniv, and Y. Bengio, "Quantized neural networks: Training neural networks with low precision weights and activations," J. Mach. Learn. Res., vol. 18, pp. 1-30, 2018.

R. Hamerly, L. Bernstein, A. Sludds, M. Soljacic, and D. Englund, "Large-Scale Optical Neural Networks Based on Photoelectric Multiplication," Phys. Rev. X, vol. 9, No. 2, p. 021032, May 2019, doi: 10.1103/PhysRevX.9.021032.

P. Merolla, R. Appuswamy, J. Arthur, S. K. Esser, and D. Modha, "Deep neural networks are robust to weight binarization and other non-linear distortions," 2016, [Online]. Available: http://arxiv.org/abs/1606.01981.

S. Zhou, Y. Wu, Z. Ni, X. Zhou, H. Wen, and Y. Zou, "DoReFa-Net: Training Low Bitwidth Convolutional Neural Networks with Low Bitwidth Gradients," vol. 1, No. 1, pp. 1-13, 2016, [Online]. Available: http://arxiv.org/abs/1606.06160.

N. Mellempudi, A. Kundu, D. Mudigere, D. Das, B. Kaul, and P. Dubey, "Ternary Neural Networks with Fine-Grained Quantization," arXiv Prepr. arXiv1705.01462, May 2017.

S. Gupta, A. Agrawal, K. Gopalakrishnan, and P. Narayanan, "Deep Learning with Limited Numerical Precision," 32nd Int. Conf. Mach. Learn. ICML 2015, vol. 3, pp. 1737-1746, Feb. 2015, [Online]. Available: http://arxiv.org/abs/1502.02551.

Y. Wang, N. Zhao, Z. Yang, Z. Zhang, B. Huang, and G. Li, "Few-mode SDM receivers exploiting parallelism of free space," IEEE Photonics Journal, 2019. doi: 10.1109/JPHOT.2019.2896645.

D. B. Strukov, G. S. Snider, D. R. Stewart, and R. S. Williams, "The missing memristor found," Nature, vol. 453, No. 7191, pp. 80-83, May 2008, doi: 10.1038/nature06932.

L. Chua, "Resistance switching memories are memristors," Appl. Phys. A, vol. 102, No. 4, pp. 765-783, Mar. 2011, doi: 10.1007/s00339-011-6264-9.

J. J. Yang, D. B. Strukov, and D. R. Stewart, "Memristive devices for computing," Nat. Nanotechnol., vol. 8, No. 1, pp. 13-24, 2013, doi: 10.1038/nnano.2012.240.

T. Gokmen and Y. Vlasov, "Acceleration of Deep Neural Network Training with Resistive Cross-Point Devices: Design Considerations," Front. Neurosci., vol. 10, Jul. 2016, doi: 10.3389/fnins.2016.00333.

C. Li et al., "Analogue signal and image processing with large memristor crossbars," Nat. Electron., vol. 1, No. 1, pp. 52-59, Jan. 2018, doi: 10.1038/s41928-017-0002-z.

A. H. Kramer, "Array-based analog computation," IEEE Micro, vol. 16, No. 5, pp. 20-29, 1996, doi: 10.1109/40.540077.

C. Lehmann, M. Viredaz, and F. Blayo, "A generic systolic array building block for neural networks with on-chip learning," IEEE Trans. Neural Networks, vol. 4, No. 3, pp. 400-407, May 1993, doi: 10.1109/72.217181.

K. Steinbuch, "Die Lernmatrix," Kybernetic, vol. 1, No. 1, pp. 36-45, 1961.

J. Feldmann et al., "Parallel convolutional processing using an integrated photonic tensor core," Nature, vol. 589, No. 7840, pp. 52-58, Jan. 2021, doi: 10.1038/s41586-020-03070-1.

J. Feldmann, N. Youngblood, C. D. Wright, H. Bhaskaran, and W. H. P. Pernice, "Alloptical spiking neurosynaptic networks with self-learning capabilities," Nature, vol. 569, No. 7755, pp. 208-214, 2019, doi: 10.1038/s41586-019-1157-8.

C. Ríos et al., "In-memory computing on a photonic platform," Sci. Adv., vol. 5, No. 2, p. eaau5759, Feb. 2019, doi: 10.1126/sciadv.aau5759.

C. Rios et al., "Integrated all-photonic non-volatile multi-level memory," Nat. Photonics, vol. 9, No. 11, pp. 725-732, 2015, doi: 10.1038/nphoton.2015.182.

(56) References Cited

OTHER PUBLICATIONS

Y. Shen et al., "Deep learning with coherent nanophotonic circuits," Nat. Photonics, vol. 11, No. 7, pp. 441-446, Jul. 2017, doi: 10.1038/nphoton.2017.93.

J. Carolan et al., "Universal linear optics," Science (80-. )., 2015, doi: 10.1126/science.aab3642.

M. Reck, A. Zeilinger, H. J. Bernstein, and P. Bertani, "Experimental realization of any discrete unitary operator," Phys. Rev. Lett., 1994, doi: 10.1103/PhysRevLett.73.58.

Z. Zhu, A. Fardoost, F. G. Vanani, A. B. Klein, G. Li, and S. S. Pang, "Coherent General—Purpose Photonic Matrix Processor," ACS Photonics, vol. 11, No. 3, pp. 1189-1196, Mar. 2024, doi: 10.1021/acsphotonics.3c01694.

* cited by examiner

FLOATING-POINT MULTIPLICATION UNIT AND FLOATING POINT PHOTONIC TENSOR ACCELERATOR

CROSS-REFERENCE TO RELATED APPLICATIONS

This application claims priority from and is related to U.S. Provisional Patent Application Ser. No. 63/492,017, entitled "FLOATING-POINT MULTIPLICATION UNIT AND FLOATING POINT PHOTONIC TENSOR ACCELERATOR", filed on Mar. 24, 2023, which is hereby incorporated into the present application by reference in its entirety.

BACKGROUND

The present application relates generally to optical computing, more specifically to photonic acceleration for floating-point vector-vector, matrix-vector, matrix-matrix, batch matrix-matrix, and tensor-tensor multiplication.

This application includes references denoted in brackets with numbers, e.g., [x], where x is a number. This numeric listing of the references is found at the end of this application. Further, these references are listed in the information disclosure statement (IDS) filed herewith. The teachings of each of these listed references is hereby incorporated hereinto by reference in their entirety.

Thanks to the increase in computing power and the development of new training techniques, artificial neural networks (ANN), especially deep neural networks (DNN), provide higher degrees of model flexibility and have achieved orders-of-magnitude performance improvements [1], [2]. The success in modern speech recognition ushered in the current trend in DNN model training: use straightforward backpropagation training algorithms and consume a large amount of training data to improve model performance [3]. Large amounts of data translate to high computational load and high cost in training. For example, to train the AlphaStar, which defeated the best human players in the real-time strategy PC game StarCraft2, over 60,000 years of the game were played during training, which would require nearly $26 million based on the current hourly rates of Google's tensor processing unit (TPU) [4]. The same challenges in training permeate into many other applications, ranging from basic science discovery to autonomous vehicles, to defense applications such as turbulence mitigation for directed-energy weapons. The economy of massively parallel computing in ANN/DNN thus boils down to power efficiency and scalability.

In comparison with the main-stream digital computing paradigms, analog implementation of parallel computing promises at least an order-of-magnitude improvement in computational efficiency [5]. The emergence of DNNs rekindled the interest in analog system implementation of neural networks. Notable examples include array-based computing using non-volatile memory (NVM) [6] and silicon photonic circuit [7], which promise 2 to 3 orders of magnitude computational efficiency improvement over current graphics processing units (GPUs). Despite the promising efficiency, analog computing lacks the high dynamic range that digital computing offers. The dynamic range of an analog signal is fundamentally limited by its noise and the errors (distortion, quantization, etc.), corresponding to an equivalent fixed-point precision representation. In contrast, its digital counterpart, using floating-point precision numbers, can represent a much wider range. Though fixed-point representation has been deployed in inference, many DNNs trained using only fixed-point numbers showed inferior performances [8]. Analog electric signal can achieve a floating-point-like precision by including pre-amplification [9]. Yet computation involving multiple operations would require amplification for every operation, which is not scalable. An analog optical system that can perform parallel floating-point computation could fundamentally resolve the dynamic range disadvantage for analog neural networks.

SUMMARY

Disclosed is a novel method for encoding a floating point number using analog hardware. The method comprises producing a first signal representing an exponent of a floating point number mapped onto a frequency of a harmonic wave. Producing a second signal representing a significand of the floating point number mapped onto an amplitude of the harmonic wave to produce a floating point number. There are numerous examples of how the floating point number may be used, such as displayed on a monitor, stored in a fixed, non-transitory storage medium for later retrieval, used in a mathematical operation using cascade modulation, used in a mathematical operation using interference, used in a mathematical operation using interference with a comb filter, used in a mathematical operation using cascade operation with summation; or a combination of the foregoing.

Also disclosed is a novel floating point number multiplication unit in a series arrangement. The floating point number multiplication unit comprises a first wave modulator that receives a first signal representing an exponent of a first floating point number mapped onto a frequency of a first harmonic wave and a second signal representing a significand of the first floating point number mapped onto an amplitude of the first harmonic wave to produce a first floating point number, representing a first factor in a multiplication. The floating point number multiplication unit includes a second wave modulator that receives a third signal representing an exponent of a second floating point number mapped onto a frequency of a second harmonic wave and a fourth signal representing a significand of the second floating point number mapped onto an amplitude of the second harmonic wave to produce a second floating point number representing a second factor in a multiplication. The exponent may be represented by a line in a frequency comb.

The first wave modulator and the second wave modulator are connected in succession as a first stage and a second stage to produce a multiplication product of the first factor and the second factor.

In one example, the first wave modulator and the second wave modulator are one of a sound wave modulator, an electromagnetic wave modulator, an optical wave modulator or a combination thereof.

Also disclosed is a floating point number multiplication unit using interference. The first wave modulator receives a first signal representing an exponent of a first floating point number mapped onto a frequency of a first harmonic wave and a second signal representing a significand of the first floating point number mapped onto an amplitude of the first harmonic wave to produce an output of a first floating point number, representing a first factor in a multiplication. The floating point number multiplication unit includes a second wave modulator that receives a third signal representing an exponent of a second floating point number mapped onto a frequency of a second harmonic wave and a fourth signal representing a significand of the second floating point number mapped onto an amplitude of the second harmonic wave to produce an output of a second floating point number representing a second factor in a multiplication. The output of a first wave modulator and the output of the second wave modulator are brought into interference to produce a multiplication product of first factor and the second factor.

Also disclosed is a floating point multiplication unit for vector multiplication in a series arrangement for vectors N>1. A first vector for multiplication based on a first wave modulator that receives a first signal representing an exponent of a first floating point number mapped onto a frequency of a first harmonic wave and a second signal representing a significand of the first floating point number mapped onto an amplitude of the first harmonic wave to produce a first floating point number, representing a first factor in a multiplication. The first vector for multiplication is also based on a second wave modulator that receives a third signal representing an exponent of a second floating point number mapped onto a frequency of a second harmonic wave and a fourth signal representing a significand of the second floating point number mapped onto an amplitude of the second harmonic wave to produce a second floating point number representing a second factor in a multiplication.

The first wave modulator and the second wave modulator are either an analog modulator or a digital modulator. The first wave modulator and the second wave modulator are connected in succession as a first stage and a second stage, i.e., a series arrangement, with the first factor in the multiplication, which is combined with the third signal to produce a multiplication product of the first factor and the second factor.

The floating point multiplication unit includes a second vector for multiplication based on a third wave modulator that receives a fifth signal representing an exponent of a third floating point number mapped onto a frequency of a third harmonic wave and a sixth signal representing a significand of the third floating point number mapped onto an amplitude of the third harmonic wave to produce a third floating point number, representing a third factor in a multiplication. The second vector for multiplication is also based on a fourth wave modulator that receives a seventh signal representing an exponent of a fourth floating point number mapped onto a frequency of a fourth harmonic wave and a fourth signal representing a significand of the fourth floating point number mapped onto an amplitude of the fourth harmonic wave to produce a fourth floating point number representing a fourth factor in a multiplication. The third wave modulator and the fourth wave modulator are connected in succession as a first stage and a second stage i.e., a series arrangement, with the third factor in the multiplication is combined with the seventh signal to produce a multiplication product of the third factor and the fourth factor.

The floating point multiplication unit includes a summation unit that sums the multiplication product of the first factor and the second factor with the multiplication product of the third factor and the fourth factor to produce a multiplication of the first vector with the second vector.

Also disclosed is a photonic unit for a floating point vector multiplication unit using a beam combiner. The floating point vector multiplication unit includes a first optical multiplexer that receives a first optical signal representing an input vector of one or more floating point numbers, each encoded using optical modes. Each floating-point number includes an exponent mapped to a frequency of light and an amplitude representing a significand of the one or more floating point numbers mapped onto a complex amplitude to produce a first multiplexed optical signal. The frequency of light may be one of a subcarrier frequency, a wavelength of light, or both.

The degree of freedom (DOF)/dimension of light used for encoding is a hyperdimension consisting of combinations of two or more degrees of freedom (DOFs)/dimensions of light.

The representing a significand of the floating point numbers mapped onto a complex amplitude includes a complex amplitude greater than base 2.

The optical mode is a degree of freedom (DOF)/dimension of light used for encoding and is one of a wavelength, a spatial mode, a polarization, a quadrature, a component of a wave vector, or a combination thereof. The spatial mode is one of: Hermite-Gaussian modes, Laguerre-Gaussian modes, discrete spatial samples forming a spatially orthonormal basis, or a combination thereof.

A second optical multiplexer that receives a second optical signal representing an input vector of one or more floating point numbers, each encoded using optical modes representing a second vector of one or more weights corresponding to the size of the input vector and coherent with the first optical signal to produce a second multiplexed optical signal. The input vector is non-temporal during one multiplication cycle to produce a first multiplexed optical signal with the input vector of floating-point numbers.

A beam combiner that receives the first multiplexed optical signal from the first optical multiplexer and the second multiplexed optical signal from the second optical multiplexer so as to combine them to produce an interference between the first optical signal and second optical signal containing multiplication results of the input vector and the second vector in a total interference intensity.

The total interference intensity is converted into an electrical signal. The electrical signal enters a nonlinear electrical element.

Also disclosed is an N by M matrix with an M by 1 vector multiplication unit using a beam combiner. The multiplication unit includes a first optical multiplexer that receives at least a first optical signal representing at least a M by 1 vector with M elements, wherein each element in the M by 1 vector is of one or more floating point numbers each encoded using optical modes, each floating-point number includes an exponent mapped to a frequency of light and an amplitude representing a significand of the one or more floating point numbers mapped onto a complex amplitude to produce a first multiplexed optical signal, and wherein M is a positive integer greater than or equal to 1.

An optical duplicator for reproducing at least the first optical signal representing the M by 1 vector into a plurality of N copies in N additional optical signals, wherein N is a positive integer greater than or equal to 1.

A set of N optical multiplexers, each receiving M additional optical signals, wherein each of the M additional optical signals is encoded using optical modes representing a second vector of one or more weights and coherent with the first optical signal, each of the N additional optical signals represent an independent row of a M by N matrix, to produce N additional multiplexed optical signals.

At least one beam combiner that receives N copies of the first multiplexed optical signal from the first optical multiplexer and the N additional multiplexed optical signals from the N optical multiplexers so as to combine them to produce N occurrences of interferences between the first optical signal and each of the N additional optical signals containing multiplication results of the M by N matrix and the M by 1 vector in N total interference intensities.

Also disclosed is a matrix and matrix multiplication using a beam combiner. A first set of N optical multiplexers that receives N optical signals where each of the N optical signals represents an independent row with M elements of a N by M matrix, wherein each element in each independent row of the N by M matrix is a floating point number encoded using optical modes, each floating-point number includes an exponent mapped to a frequency of light and an amplitude representing a significand of the one or more floating point numbers mapped onto a complex amplitude on a second orthogonal degree of freedom (DOF)/dimension of light and is non-temporal during one multiplication cycle to produce N multiplexed optical signals, and wherein M and N are each a positive integer greater than or equal to 1.

A first optical duplicator for reproducing each of the N multiplexed optical signals representing independent rows of an N by M matrix into a plurality of W copies, wherein W is a positive integer greater than or equal to 1.

A second set of W optical multiplexers, which is identical to the first optical duplicator that receives W additional optical signals, wherein each of the W additional optical signals is coherent with the N optical signals, each of the W additional optical signals representing an independent column with M elements of the M by W matrix, wherein each element in each independent column of the M by W matrix is a floating point number encoded using optical modes, each floating-point number includes an exponent mapped to a frequency of light and an amplitude representing a significand of the one or more floating point numbers mapped onto a complex amplitude as each element in each independent row of the N by M matrix to produce W additional multiplexed optical signals.

A second optical duplicator for reproducing each of the W multiplexed signals representing an independent column of the M by W matrix into a plurality of N copies, which is identical to the first set of N optical multiplexers.

At least one beam combiner that receives two sets of N by W multiplexed optical signals representing appropriately duplicated rows or columns of each of the N by M matrix and the M by W matrix so as to combine them to produce N by W occurrences of interferences between each of row of the N by M matrix and the column of the M by W matrix containing multiplication results in N by W total interference intensities.

Also disclosed is a multiplication unit for tensor multiplication. A first optical multiplexer that receives a first optical signal representing a first tensor with rank p, a shape of the first tensor is $[N_1, N_2, \ldots, N_{p-1}, M]$.

A first encoder for encoding each element of the first tensor along the first rank to the $p^{th}$ rank to the first to the $p^{th}$, and each element is encoded with optical modes as a floating point number that includes an exponent mapped to a frequency of light and an amplitude representing a significand of the one or more floating point numbers mapped onto a complex amplitude, respectively.

A second optical multiplexer that receives a second optical signal, coherent with the first optical signal, representing a second tensor with a rank q, the shape of the second tensor is $[M, W_1, \ldots, W_{q-1}]$. $N_1, N_2, \ldots, N_{p-1}, M, W_1, \ldots, W_{q-1}$, where p and q are each a positive integer greater or equal to one.

A first set of optical duplicators for reproducing the multiplexed optical signals representing the tensors into a plurality of $W_1 \times W_2 \times \ldots \times W_{q-1}$ copies in the $(p+1)^{th}$ to the $(p+q)^{th}$ orthogonal degrees of freedom (DOF)/dimensions of light.

A second encoder for encoding each element of the second tensor along the first rank to the $q^{th}$ rank on to the $(p)^{th}$ to the $(p+q-1)^{th}$, and each element is encoded with optical modes as a floating point number that includes an exponent mapped to a frequency of light and an amplitude representing a significand of the one or more floating point numbers mapped onto a complex amplitude, respectively, with an identical element light mapping as the duplicates of the $(p+1)^{th}$ to the $(p+q)^{th}$ of the first tensor.

A second set of optical duplicators for reproducing the multiplexed signals representing the second tensor into a plurality of $N1 \times N2 \times \ldots \times Np-1$ copies in the first to the (p−1)th, which are identical to the element-light mapping as the first to the (p−1)th of the first tensor.

At least one beam combiner that receives two sets of $[N1, N2, \ldots, Np-1, M, W_1, \ldots, Wq-1]$ multiplexed optical signals from the two sets of optical duplicators to combine them to produce $[N1, N2, \ldots, Np-1, W1, \ldots, Wq-1]$ occurrences of interferences containing summation of the multiplication of $N1 \times N2 \times \ldots \times Np-1 \times W1 \times \ldots \times Wq-1$ distinct M-element vector-vector multiplications in interference intensities.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1(*b*) is a diagram of a neuron model implemented by a layer of the ANN of FIG. 1(*a*), according to the prior art;

FIG. 1(*c*) is a diagram of matrix multiply-accumulate operations required to carry out the multiplication of two arrays for the ANN of FIG. 1(*a*), according to the prior art;

FIG. 1(*d*) is a diagram of matrix multiply-accumulate operations required to carry out the multiplication of two arrays of FIG. 1(*c*), according to the prior art;

DETAILED DESCRIPTION

Non-Limiting Definitions

Figure 1:
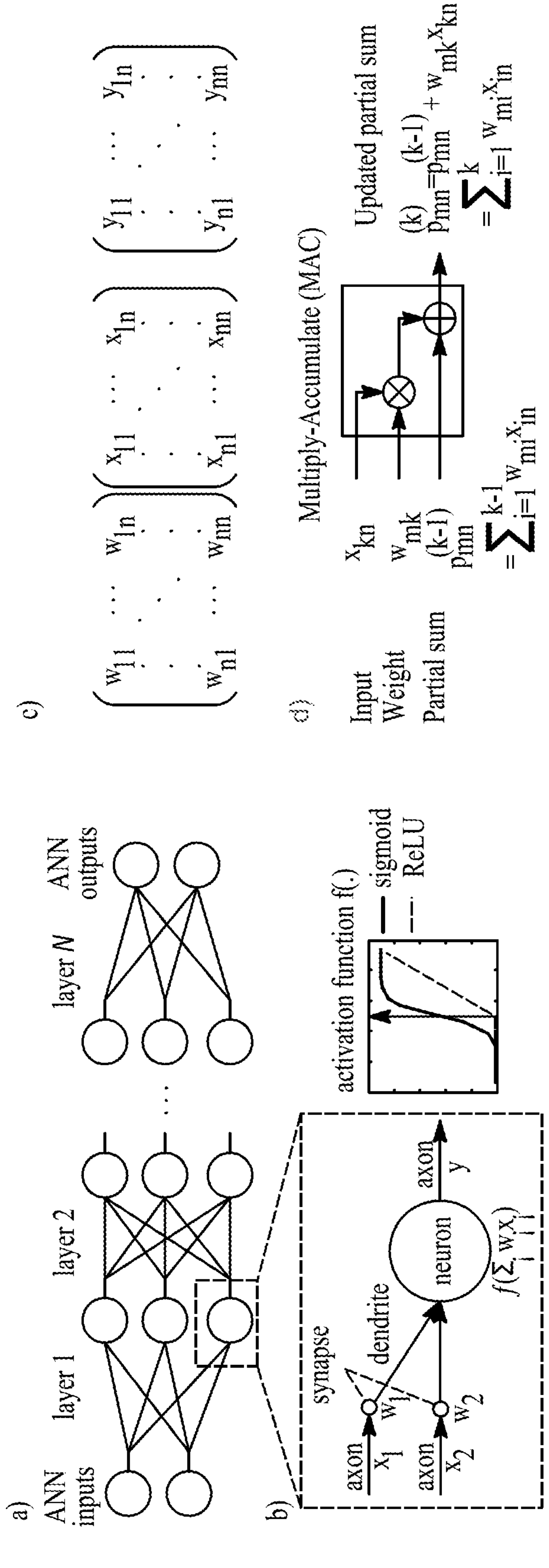
FIG. 1 (Prior Art)
FIG. 1(*a*) is a diagram of an artificial neural network (ANN) with a convolutional hidden layer and a fully-connected output layer, according to the prior art.

The term "beam combiner" is a device that allows coherent beams to interfere with each other. It can be implemented by, but not limited to, reflective optics, refractive optics, diffractive optical elements, fiber optical devices, or a combination of such components.

The term "beam duplicator" is a device that generates two or more copies of incident light that have one or more prescribed parameters the same as the incident light, including wavelengths, spatial modes, polarizations, quadratures, and wave vectors. It can be implemented by, but not limited to, reflective optics, refractive optics, diffractive optical elements, fiber optical devices, or a combination of such components.

The term "beam splitter" is a device that can split a propagating light into two or more paths. It can be implemented by, but not limited to, reflective optics, refractive optics, diffractive optical elements, fiber optical devices, or a combination of such components.

The term "element-to-orthogonal degree of freedom (DOF)/dimension of light mapping" is a correspondence between matrix or vector elements to independent parameters of light, including a wavelength, a spatial mode, a polarization, a quadrature, and a component of wave vector.

The term "light" is electromagnetic radiation that includes both visible and non-visible portions of the light spectrum.

The term "hyperdimension" means consisting of combinations of two or more degrees of freedom (DOFs)/dimensions of light.

The term "multiplication cycle" means the mathematical multiplication operation, which is included during a single computational cycle.

The term "subset of a dimension or hyperdimension" means a subset of independent parameters in one degree of freedom (DOF)/dimension of light or one hyperdimension of light.

Acronyms Used in this Patent

ADC—Analog-to-Digital Conversion
AM—Amplitude Modulation
BER—Bit Error Ratio
BPF—Band Pass Filter
DSP—Digital Signal Processing
EDFA—Erbium-Doped Fiber Amplifier
EWC—Electrical Wavefront Correction
FSO—Free-Space Optical
HM—Half Mirror
I—In-phase
Q—In Quadrature
LO—Local Oscillator
MPLC—Multi-plane light conversion
NRZ BPSK—Non-Return-to-zero (NRZ) to Binary Phase-Shift-Keying (BPSK)
PBS—Polarize Beam Splitter
PC—Polarization Controller
PD—Phase Detector
PM—Phase Modulation
PPM—Pulse-Position Modulation
PSK—Phase-Shift Keying
QWP—Quarter Wave Plate
VA—Variable Attenuator
WDM—Wavelength-Division Multiplexing

BACKGROUND

Electronics and photonics, by and large, have claimed their respective technical roles in the information society so far. Electronics has dominated technologies for the generation and processing of information while photonics has dominated technologies for the transmission of information. As the processing power of electronic integrated circuits (IC) fails to grow according to Moore's law, the optics and photonics community has been motivated to explore optical and photonic information processing. These efforts include an optical transistor [1], [2] and logic gates for general-purpose optical computing [3], [4], as well as Fourier optics for special-purpose information processing [5]. However, by the 1980s, the mistakes of over-selling the role and capability of optics in computing had already set the field back several times, and set the field almost dormant in the ensuing two decades [6].

Representation of Floating Point Number and Multiplication

Figure 2:
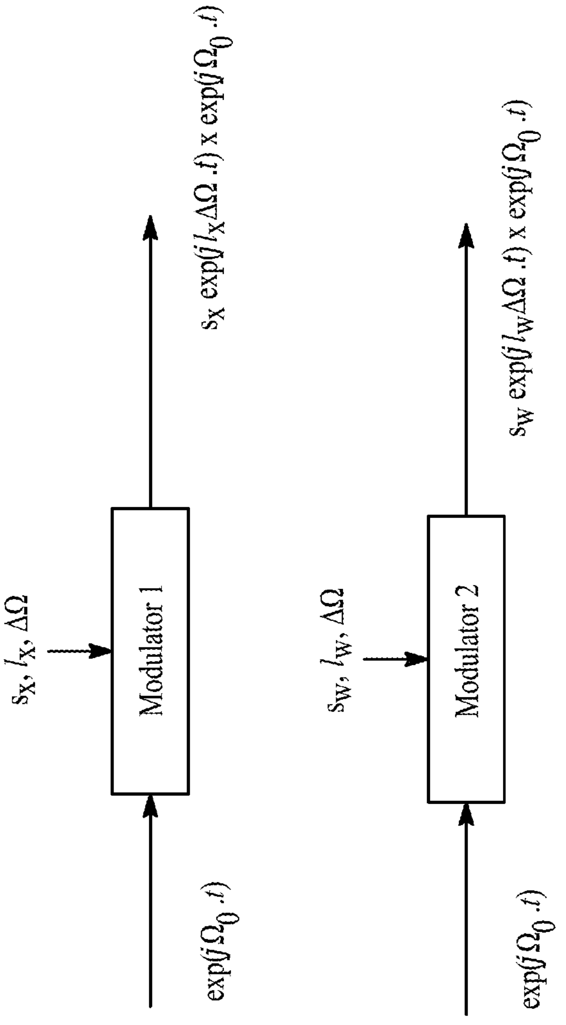
FIG. 2 is a diagram of encoding floating point numbers using a harmonic wave, according to one aspect of the present invention.

Turning now to FIG. 2, one way to encode a floating-point number is to map the significand on the amplitude and exponent on the frequency of a harmonic wave, be it sound, electromagnetic, or optical wave using a modulator, as shown below. One aspect of the present invention is that it exploits the multi-dimensional nature of light, floating-point encoding and computation are mapped onto appropriate physical attributes of light. Specifically, the exponent is mapped onto the frequency (subcarrier or wavelength) and the significand is mapped onto the complex amplitude.

Figure 3A:
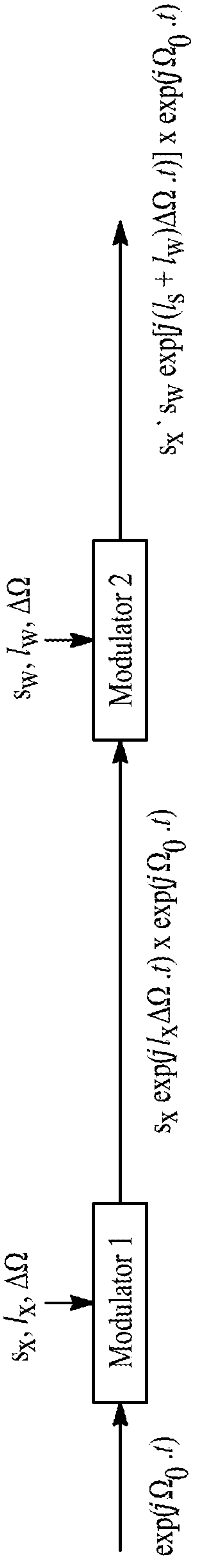
FIG. 3A is a diagram of scalar multiplication by cascaded modulation, according to one aspect of the present invention.

As shown in FIG. 3, to produce the multiplication of two floating-point numbers, one can use cascaded modulation as shown. More specifically, shown is a first wave modulator that receives a first signal representing a first floating point number modulated on the carrier $$\exp(j\Omega_0 \cdot t)$$

A second wave modulator that receives a second signal representing a second floating point number. A series arrangement in which the first wave modulator and the second wave modulator are connected in succession as a first stage and a second stage to produce a multiplication product $$s_x \cdot s_w \exp[j(l_s + l_w)\Delta\Omega \cdot t] \times \exp(j\Omega_0 \cdot t)$$

of the first factor and the second factor.

In this example, the floating point number may be displayed on a computer display. Alternatively, or in addition to displaying, the floating point number is stored in a fixed, non-transitory storage medium for later retrieval. The floating point number may be used in a mathematical operation using cascade modulation, or in a mathematical operation using interference, or using interference with a comb filter, or using the floating point number in a mathematical operation using cascade operation with summation, or a combination thereof.

Multiplication of Two Floating Point Vectors

Figure 3B:
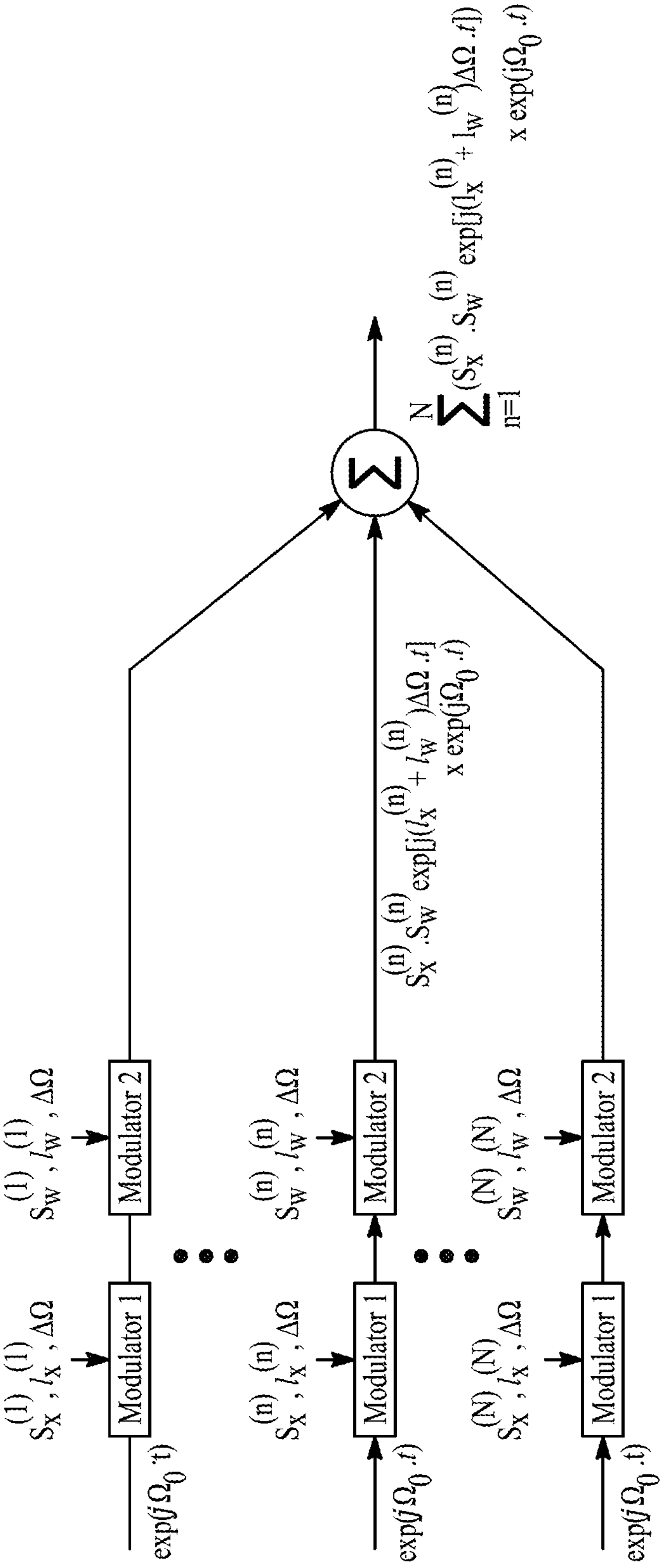
FIG. 3B is a diagram of a multiplication of two floating point vectors by accumulation, parallelized floating point number or scalar multiplications by cascaded modulation, according to one aspect of the present invention.

FIG. 3B is a diagram of a multiplication of two floating point vectors by accumulation parallelized floating point numbers, or scalar multiplications as shown. The number of elements of the vector can be from 1 up through N, where N is a positive integer.

Multiplication of Two Floating Point Numbers Using Interference

Figure 4:
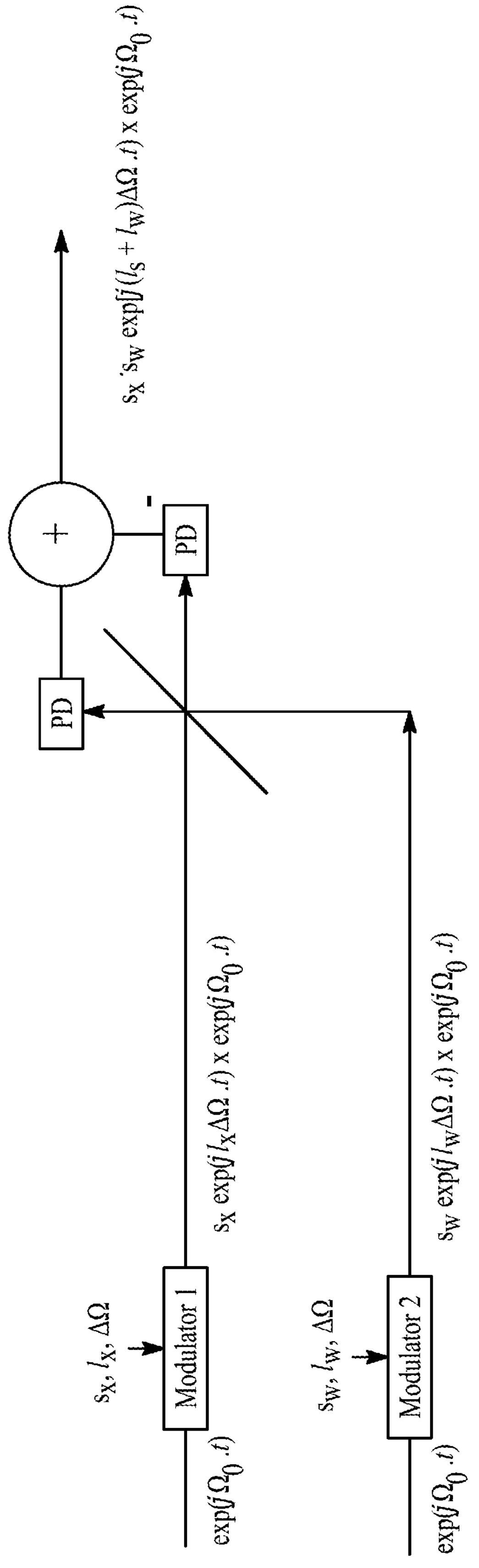
FIG. 4 is a diagram of scalar multiplication by interference, according to one aspect of the present invention.

FIG. 4 illustrates a floating point number multiplication unit using interference. The first wave modulator receives a first signal a first floating point number modulated onto a carrier exp(j$\Omega_0$·t) to produce an output of a first floating point number, representing a first factor in a multiplication. The floating point number multiplication unit includes a second wave modulator that receives a second signal representing a second floating point number modulated onto a coherent carrier exp(j$\Omega_0$·t) to produce an output of a second floating point number representing a second factor in a multiplication. The output of a first wave modulator and the output of the second wave modulator are brought into interference to produce a multiplication product of first factor and the second factor $$s_x \cdot s_w \exp[j(l_s + l_w)\Delta\Omega \cdot t] \times \exp(j\Omega_0 \cdot t).$$

The first wave modulator and the second wave modulator are one of a sound wave modulator, an electromagnetic wave modulator, or an optical wave modulator. In one example, the exponent may be represented by a line in a frequency comb.

Multiplication Using a Comb Source

Figure 5:
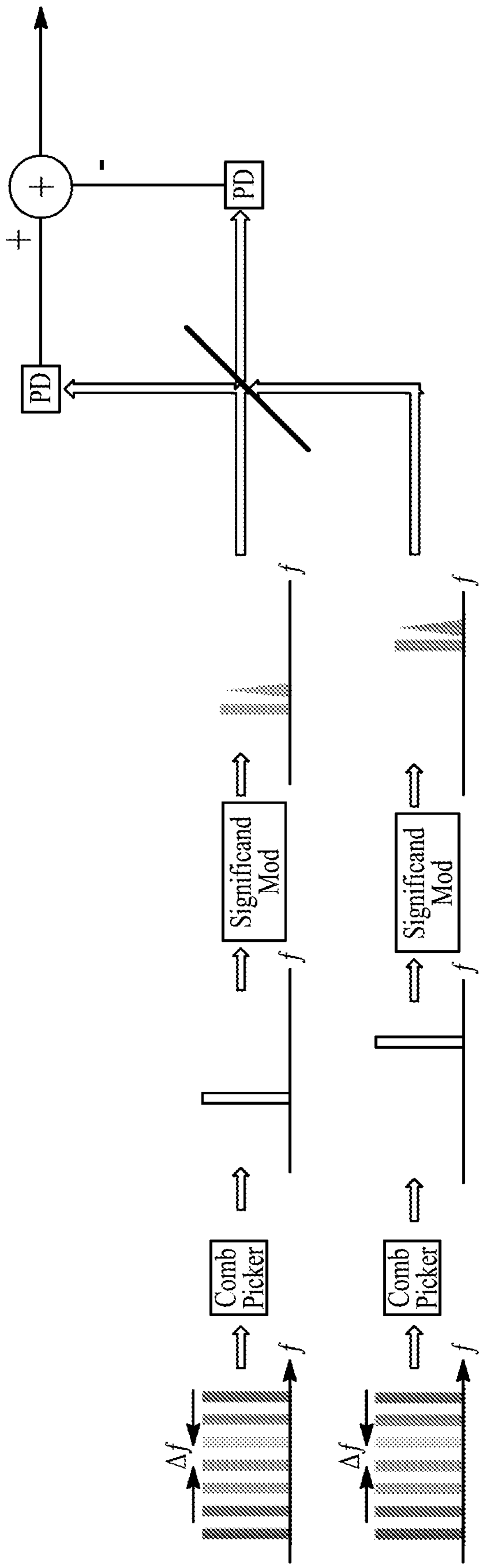
FIG. 5 is a diagram of scalar multiplication by interference using a comb source, a comb picker for encoding the exponent, followed by significand modulation and interference, according to one aspect of the present invention.

FIG. 5 is a diagram of scalar multiplication by interference using a comb source. As shown, a comb picker encodes the exponent followed by significand modulation and interference as described in FIG. 4 above.

Neural Networks

In recent years, ICs have indeed not been able to sustain the exponential growth according to Moore's law. Against this backdrop, there have been renewed efforts in exploring the role of optics in computing [7], including pushing optical interconnects to ever shorter length scales as well as demonstrating new computing paradigms such as optical neuromorphic computing [8], [9], [10], [11], [12], [13], [14] and optical reservoir computing [15], [16], [17], [18], [19], [20]. In the meantime, new applications based on artificial intelligence (AI)/machine learning (ML) implemented using artificial neural networks (ANN) have proliferated at virtually every corner in academia, industry and society in general, despite the stagnation in IC processing power. A key computation that enabled ANN, namely, matrix-vector multiplications, is performed using GPUs and more recently application specific integrated circuit (ASIC), such as Google's TPUs. Currently, GPUs and TPUs are pushed to their limits as well. Therefore, future developments in ANNs depend on advances in both software and hardware. The three main hardware ingredients for ANNs are:

1. Interconnects,
2. Matrix-vector multiplication, and
3. Nonlinearity.

Since optics can implement the first two functions as well as, if not better than, electronics, and optical nonlinearity at the per neuron level is actually practical, now is the right time to explore the role of optics in ANNs without repeating the mistakes in the past.

There are three popular ANN models [21], namely, (a) multi-layer perceptrons, also known as fully-connected (FC) networks, (b) convolutional neural networks (CNN), and (c) recurrent neural networks (RNN). All models require matrix multiplication operations. FIG. 1 shows an ANN with a convolutional hidden layer and a fully-connected output layer and the multiply-accumulate operations that are required for calculating matrix multiplication on a digital processor.

In modern microprocessors, memory access consumes most of the processing energy. Per data access, dynamic random-access memory (DRAM) consumes two orders of magnitude higher energy than small on-chip memory. Therefore, by optimizing the reusability of data stored on local memories, the total energy consumption can be greatly reduced. The challenge, however, is the limited capacity of local memories (several kilobytes) compared to DRAMs (tens of gigabytes to terabytes). For example, Google's TPU, in which data storage is placed in registers close to the logic units, has demonstrated an energy efficiency of ~1 pJ/MAC, a 20-fold reduction compared to commercially available GPUs [21]. Yet, power dissipation on memory access is still 3 times more than that spent on logic operations, which is unlikely to be reduced further with the current approach.

To address the high demand for computing power in conventional digital floating-point ANNs, low-precision network schemes [22], [23], [24], have been successfully introduced to compress the size of the model and reduce the memory footprint. In these low-precision digital ANNs, the inputs and weights of each layer are stored in fixed-point format, typically with precisions lower than 16 bits. However, to successfully compress an ANN model without sacrificing its performance, the model must be large and complex enough in its structure to tolerate the error from low-precision computations [25], [26]. The added complexity and scale of ANN model diminish the power benefit from using low-precision data formats. In addition, although the weights can be stored with limited dynamic range, the intermediate results, such as the activations and gradients, have a much higher dynamic range as a result of the multiplications between the inputs and weights [27], [28], [29]. These intermediate results often need to be cached in floating-point format to achieve the expected inference performance.

Figure 6:
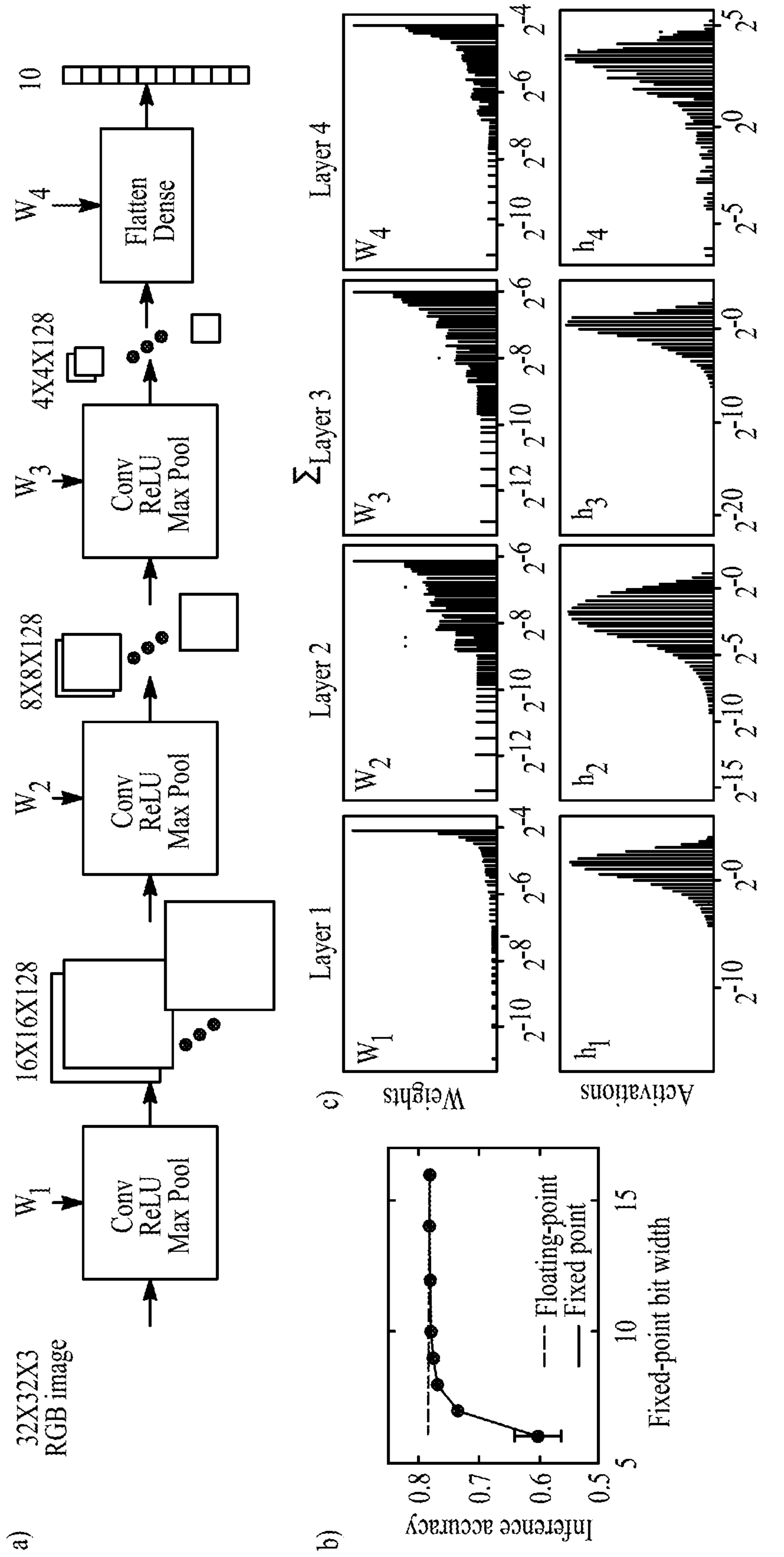
FIG. 6 is a diagram of a fixed-point CIFAR-10 image classification model, according to one aspect of the present invention.

FIG. 6 shows an example of a fixed-point ANN model that classifies the images in the CIFAR-10 dataset. More specifically, FIG. 6A illustrates the structure of the ANN model. FIG. 6B depicts inference accuracy vs. the fixed-point bit width. FIG. 6C illustrates distributions of the weights and activations in each layer, plotted in log-scale with base 2 for visualizing the dynamic range. The model consists of 3 convolutional layers and one fully connected layer. With this structure, it is possible to safely accommodate 8-bit fixed-point inputs and weights with only minor impairment on the inference accuracy, as shown in FIG. 6B. FIG. 6C is a plot of the distributions of weights and activations in each layer of the 8-bit fixed-point model. While the weights all have dynamic ranges below $2^8$, the activations can easily reach a dynamic range beyond $2^{12}$. The down-conversion of the activations to 8-bit or lower fixed-point inputs of the subsequent layer results in the performance drop in FIG. 6B when using low-precision format.

Usage Examples

Disclosed is a design to demonstrate the first analog accelerator capable of performing floating-point operations.

This objective distinguishes itself from those of current efforts in electronic and photonic analog accelerators limited to fix-point calculations. Exploiting the multi-dimensional nature of light, floating-point encoding and computation is mapped onto appropriate physical attributes of light. Specifically, the exponent is mapped onto the frequency (subcarrier or wavelength), and the significand is mapped onto the complex amplitude. Such encoding, in combination with coherent mixing, naturally produces multiply-accumulation of floating-point numbers.

In addition to demonstrating the floating-point photonic accelerators (FPA), they also demonstrated is their applications in neural network training. A scalable and power-efficient floating-point analog tensor accelerator is a foundational and vertical technology applicable across the spectrum of applications in harnessing artificial intelligence for both commercial and defense applications.

Scientific Approaches

Floating-Point Representation

Consider the multiplication of two N-element floating-point vectors, w and x, representing, for example, a row vector of a weight matrix and an input vector in an ANN layer, producing one element, y in the activation vector. In floating-point representation, an element, $w_n$ or $x_n$, in the w or x vector, is represented by a fixed-point significand and an exponent in some base $\beta$, $$w_n = s_w^{(n)} \times \beta^{l_w^{(n)}},\ x_n = s_x^{(n)} \times \beta^{l_x^{(n)}}. \quad (1)$$

In binary floating-point format, $\beta=2$ and each bit of the significand $$s_w^{(n)}$$

and $$s_x^{(n)}$$

is either 0 or 1. Since the optical amplitude modulation can produce multiple analog levels, typically from $\beta=4$ to 128 levels, depending on the signal-to-noise ratio, the base can be an integer greater than 2. Therefore, the same significand can be represented with fewer "optical digits" than the binary floating-point representation. The product y between two floating-point vectors is given by, $$y = \sum_{n=1}^{N} s_w^{(n)} s_x^{(n)} \times \beta^{l_w^{(n)} + l_x^{(n)}}. \quad (2)$$

The multiplication result can be further expressed as a summation of terms of multiple exponent levels l i.e., $$y = \sum_l s_{y,l} \times \beta^l = \sum_l \sum_{i \in I(l)} s_w^{(i)} s_x^{(i)} \times \beta^l,\ I(l) = \{n : l_w^{(n)} + l_x^{(n)} = l\}. \quad (3)$$

The significand at the same exponent level in the multiplication result can be added directly, and the final results are calculated by combining all the exponent levels.

Figure 7:
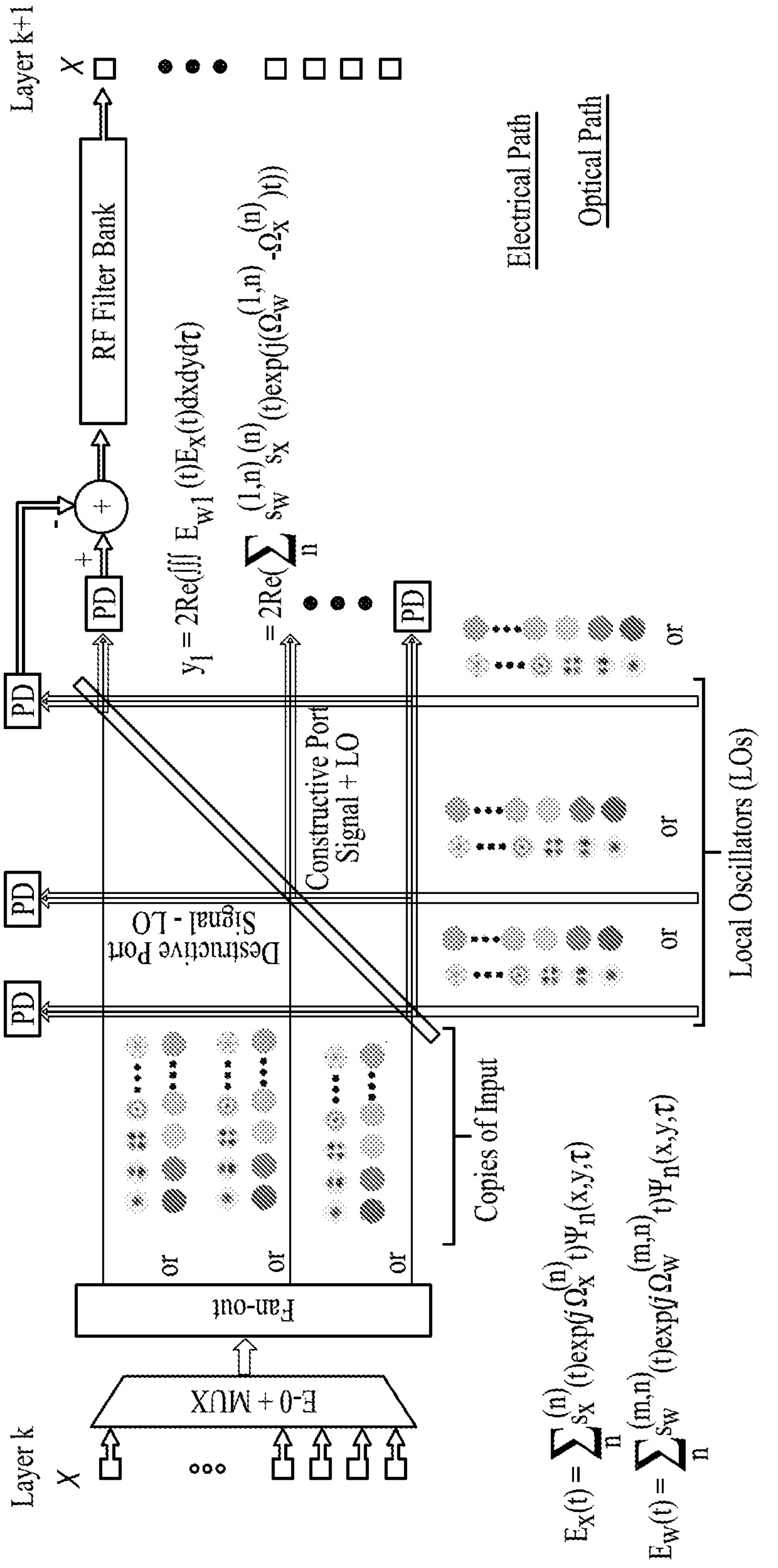
FIG. 7 is a diagram of a floating-point photonic matrix-vector multiplication based on interference and mode-division multiplexing (MDM) or wavelength-division multiplexing (WDM), according to one aspect of the present invention, according to one aspect of the present invention.

Floating-Point Photonic Accelerator (FPA): Matrix-Vector Multiplication as an Example Our proposed photonic accelerator for parallelized matrix-vector multiplication is shown in FIG. 7. In this approach, multiplications are performed by coherent mixing, and accumulations are performed in the spatial-mode or wavelength domain. The input vector and each row in the weight matrix are element-wise encoded using optical modes $\Psi_n(x, y, \tau)$ that covers all degrees of freedom of light (e.g., wavelength, polarization state, Hermite-Gauss (HG) modes, etc.). The multiplexed input vector is fanned out into a desirable number of copies and mixed with the corresponding local oscillators (LO) representing the row vectors comprising the weight matrix. Because of the orthogonality among wavelength channels or spatial modes [30], coherent mixing between a pair of signal and LO streams produces the vector-vector multiplication. With parallelization in spatial locations, the configuration in FIG. 7 realizes matrix-vector multiplication. More specifically, FIG. 7 illustrates a Floating-point photonic matrix-vector multiplication based on mode-division multiplexing (MDM) or wavelength-division multiplexing (WDM).

The input vector is encoded in the wavelength or mode dimension and fanned out to N copics matching the number of columns in the weight matrix. Each row of the weight matrix is encoded similarly to the input vector in parallel. The balanced output ports produce the multiply-accumulation in the mode or wavelength dimension. Exponents of the inputs and weights are represented by different subcarrier frequencies, $$\Omega_x^{(n)}$$

and $$\Omega_w^{(m,n)},$$

respectively.

In the photonic matrix-vector multiplier, the exponents of the floating-point multiplicands can be encoded in RF/microwave subcarrier frequencies, $$\Omega_x^{(n)}$$

and $$\Omega_w^{(m,n)},$$

as shown in FIG. 6. Consider the multiplication of two N-element floating-point vectors, w and x, the elements in the vectors are encoded using N orthogonal modes of the light beams, as well as L subcarrier frequencies for the exponents. For simplicity, the principle of optical vector-vector multiplication is demonstrated here. The electric field of the two mutually coherent light beams can be represented by $$E_w(t) = \sum_{n=1}^{N} s_w^{(n)}(t)\exp\left(j\Omega_w^{(n)}t\right)\cdot\Psi_n(x, y, \tau). \tag{4}$$

$$E_w(t) = \sum_{n=1}^{N} s_x^{(n)}(t)\exp\left(j\Omega_x^{(n)}t\right)\cdot\Psi_n(x, y, \tau). \tag{5}$$

Here $$\Omega_x^{(n)} \text{ and } \Omega_w^{(n)}$$

are the subcarrier frequencies that represent the exponents $$l_x^{(n)} \text{ and } l_w^{(n)},$$

respectively. The optical mode $\Psi_n(x, y, \tau)$ can be spatial modes, wavelengths, spatial locations, or hyper-modes that are constructed by combining multiple degrees of freedom of light. The orthogonality among the optical modes implies $$\int\int\int \Psi_n^{\dagger}(x, y, \tau)\Psi_m(x, y, \tau)dxdyd\tau = \delta_{mn},$$

where $\delta_{mn}$ is the Dirac-delta function, and † denotes the complex conjugate. The interference signal between the two light beams detected by a pair of balanced detectors naturally produces the dot product of these two vectors, $$\begin{aligned} I(t) &= |E_w(t) + E_x(t)|^2 - |E_w(t) - E_x(t)|^2 \\ &= 2\mathrm{Re}\left(\int\int\int E_w^{\dagger}(t)E_x(t)dxdyd\tau\right) \\ &= 2\mathrm{Re}\left(\sum_{n=1}^{N} s_w^{(n)}(t)s_x^{(n)}(t)\exp\left(j\left(\Omega_w^{(n)} - \Omega_x^{(n)}\right)t\right)\right) \end{aligned} \tag{6}$$

The results of the product can be extracted by passing the balanced detection signals through a filter bank, and the significand is exactly the amplitude of the output signal at the bandpass filter centered at $$\left(\Omega_w^{(n)} - \Omega_x^{(n)}\right).$$

Because of the multi-dimensionality nature of light, the floating-point format can be directly encoded, and multiply-accumulated in the optical domain. In our proposed scheme:

The exponent of a vector, $l_w$ or $l_x$, can be encoded cither in the RF/microwave subcarrier frequency (using subcarrier frequency mapping) or wavelength (using comb-line mapping), as will be shown below.

Exponents can be processed/detected using passive filtering/demultiplexing to separate multiplication products with different exponents.

The products with the same exponent, $l_w+l_x$ in the multiplication product, will still be accumulated together after photodetection Eq.

$$y = \sum_{l} s_{y,l} \times \beta^l = \sum_{l}\sum_{i\in I(l)} s_w^{(i)}s_x^{(i)} \times \beta^l,\ I(l) = \left\{n : l_w^{(n)} + l_x^{(n)} = l\right\} \tag{3}$$

Google cloud TPUs use half-precision floating point, i.e., $l_w$ and $l_x$ are 5-bit wide, equivalent to 32 RF subcarriers or comb lines (for the case of $\beta=2$), which are comfortably within the capability of optical communications technology.

The principles of these two schematics are presented in the following sections as examples.

FPA Using Optical Frequency Combs

Figure 8:
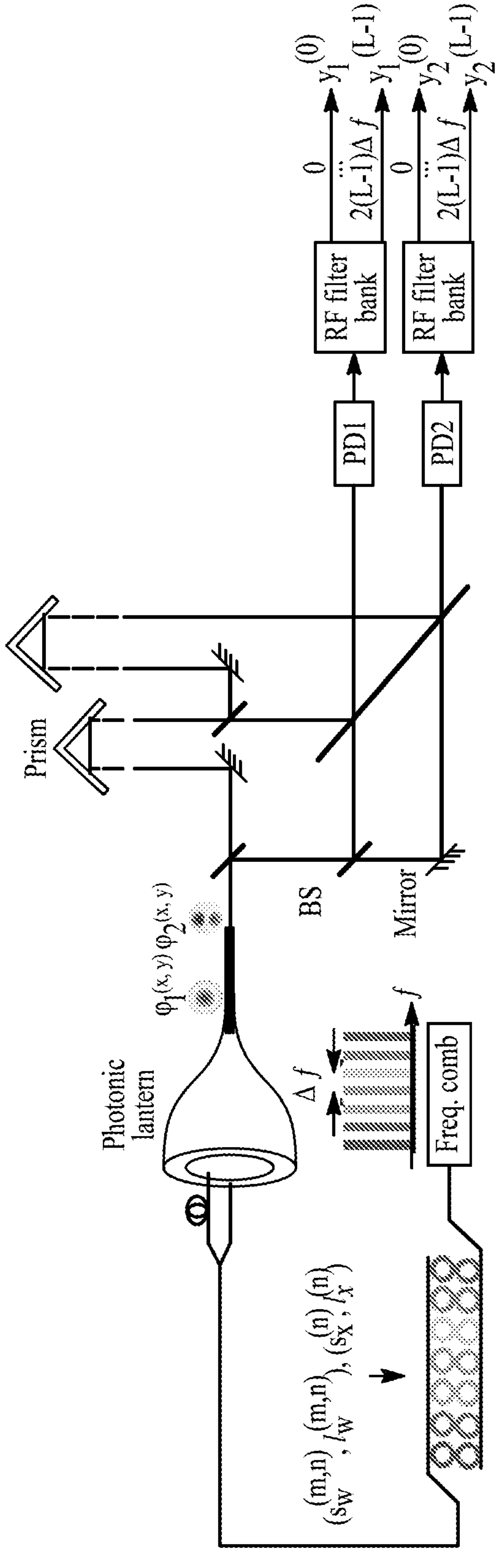
FIG. 8 is a diagram of an FPA for 2×2 matrix-vector multiplication using an optical frequency comb and mode multiplexing using a photonic lantern, according to one aspect of the present invention, according to one aspect of the present invention.

One approach to encode the exponent level is by using switches/frequency-selective modulators to map exponents to lines in a coherent optical frequency comb (OFC), and accumulation can be performed in the spatial-mode dimension, as shown in FIG. 8. The electrical fields representing the two vector multiplicands are expressed as:

$$\begin{aligned} E_w(t) &= \sum_{n=1}^{N} s_w^{(n)}(t)\exp\left(j2\pi\left(f_0 + l_w^{(n)}f_r\right)t\right)\varphi_n(x, y) \\ E_x(t) &= \sum_{n=1}^{N} s_x^{(n)}(t)\exp\left(j2\pi\left(f_0 - l_x^{(n)}f_r\right)t\right)\varphi_n(x, y) \end{aligned}, \tag{7}$$

where $f_0$ is the central wavelength, and $f_r$ is the comb line spacing. Here spatial modes are chosen as the dimension of multiply-accumulation, i.e., $\Omega_n(x, y, \tau)=\varphi_n(x, y)$, where $\varphi_n$ can be one of the Hermite-Gaussian modes in free-space. Notice here that the exponent level encoding has different signs $$\left(+l_w^{(n)}f \text{ and } -l_x^{(n)}f\right)$$

for the two multiplicands. This sign difference ensures that the Rf/microwave carrier of the interference signal generates the frequency $$f_r\left(l_w^{(n)} + l_x^{(n)}\right).$$

Based on the orthogonality among spatial modes, the interference signal after balanced detection is, $$I(t) \propto \sum_{n1}^{N} s_w^{(n)}(t)s_x^{(n)}(t)\cos\left(2\pi f_r\left(l_w^{(n)} + l_x^{(n)}\right)t\right). \tag{8}$$

The amplitude representing the product of the significands $$s_w^{(n)}(t)s_x^{(n)}(t)$$

can be extracted from the RF filter centered at the frequency $l_y f_r$.

FIG. 7 shows the schematic for experimentally performing a floating-point 2×2 matrix-vector multiplication using OFCs. There are 8 time-dependent variables to be measured in total: 2 input vector elements, 4 matrix elements, and 2 output vector elements. A brute-force implementation would have required 6 transmitters, 2 receivers, and 8 scopes, if all independent measurements are done simultaneously. To perform the experiment with limited resources, the experiment is shown in FIG. 7 is carried out with only 1 transmitter, and 2 receivers are used. All streams representing the input vector elements and matrix elements are generated from the same source and modulated with different amounts of delays.

For this proposed research program, the focus is on pushing the number of exponent levels, L, to be greater than 16, as scalability is a unique advantage of using the OFC, which could be achieved by having a detection bandwidth of 32 GHz and the comb line spacing $f_r$=2 GHz. As to the size of the matrix-vector and vector-vector multiplications, a fixed-point 4×4 photonic matrix multiplication in free space was demonstrated previously. Based on currently-available mode-multiplexing technologies, the size of matrix multiplication can be scaled to at least 300×300.

As shown, the floating point vector multiplication unit includes a first optical multiplexer that receives a first optical signal representing an input vector of one or more floating point numbers, each encoded using optical modes. Each floating-point number includes an exponent mapped to a frequency of light and an amplitude representing a significand of the one or more floating point numbers mapped onto a complex amplitude to produce a first multiplexed optical signal. The frequency of light may be one of a subcarrier frequency, a wavelength of light, or both.

The degree of freedom (DOF)/dimension of light used for encoding is a hyperdimension consisting of combinations of two or more degrees of freedom (DOFs)/dimensions of light.

The representing a significand of the floating point numbers mapped onto a complex amplitude includes a complex amplitude greater than base 2.

The optical mode is a degree of freedom (DOF)/dimension of light used for encoding and is one of a wavelength, a spatial mode, a polarization, a quadrature, a component of a wave vector, or a combination thereof. The spatial mode is one of: Hermite-Gaussian modes, Laguerre-Gaussian modes, discrete spatial samples forming a spatially orthonormal basis, or a combination thereof.

A second optical multiplexer that receives a second optical signal representing an input vector of one or more floating point numbers, each encoded using optical modes representing a second vector of one or more weights corresponding to a size of the input vector and coherent with the first optical signal to produce a second multiplexed optical signal. The input vector is non-temporal during one multiplication cycle to produce a first multiplexed optical signal with the input vector of floating-point numbers.

A beam combiner that receives the first multiplexed optical signal from the first optical multiplexer and the second multiplexed optical signal from the second optical multiplexer so as to combine them to produce an interference between the first optical signal and the second optical signal containing multiplication results of the input vector and the second vector in a total interference intensity.

The total interference intensity is converted into an electrical signal. The electrical signal enters a nonlinear electrical element.

As shown, an N by M matrix with an M by 1 vector multiplication unit using a beam combiner. The multiplication unit includes a first optical multiplexer that receives at least a first optical signal representing at least a M by 1 vector with M elements, wherein each element in the M by 1 vector is of one or more floating point numbers each encoded using optical modes, each floating-point number includes an exponent mapped to a frequency of light and an amplitude representing a significand of the one or more floating point numbers mapped onto a complex amplitude to produce a first multiplexed optical signal, and wherein M is a positive integer greater than or equal to 1.

An optical duplicator for reproducing at least the first optical signal representing the M by 1 vector into a plurality of N copies in N additional optical signals, wherein N is a positive integer greater than or equal to 1.

A set of N optical multiplexers, each receiving M additional optical signals, wherein each of the M additional optical signals is encoded using optical modes representing a second vector of one or more weights and coherent with the first optical signal, each of the N additional optical signals represent an independent row of a M by N matrix, to produce N additional multiplexed optical signals.

At least one beam combiner that receives N copies of the first multiplexed optical signal from the first optical multiplexer and the N additional multiplexed optical signals from the N optical multiplexers so as to combine them to produce N occurrences of interferences between the first optical signal and each of the N additional optical signals containing multiplication results of the M by N matrix and the M by 1 vector in N total interference intensities.

Also disclosed is a matrix and matrix multiplication using a beam combiner. A first set of N optical multiplexers that receives N optical signals where each of the N optical signals represents an independent row with M elements of a N by M matrix, wherein each element in each independent row of the N by M matrix is a floating point number encoded using optical modes, each floating-point number includes an exponent mapped to a frequency of light and an amplitude representing a significand of the one or more floating point numbers mapped onto a complex amplitude on a second orthogonal degree of freedom (DOF)/dimension of light and is non-temporal during one multiplication cycle to produce N multiplexed optical signals, and wherein M and N are each a positive integer greater than or equal to 1.

A first optical duplicator for reproducing each of the N multiplexed optical signals representing independent rows of an N by M matrix into a plurality of W copies, wherein W is a positive integer greater than or equal to 1.

A second set of W optical multiplexers, which is identical to the first optical duplicator that receives W additional optical signals, wherein each of the W additional optical signals is coherent with the N optical signals, each of the W additional optical signals representing an independent column with M elements of the M by W matrix, wherein each element in each independent column of the M by W matrix is a floating point number encoded using optical modes, each floating-point number includes an exponent mapped to a frequency of light and an amplitude representing a significand of the one or more floating point numbers mapped onto a complex amplitude as each element in each independent row of the N by M matrix to produce W additional multiplexed optical signals.

A second optical duplicator for reproducing each of the W multiplexed signals representing an independent column of the M by W matrix into a plurality of N copies, which is identical to the first set of N optical multiplexers.

At least one beam combiner that receives two sets of N by W multiplexed optical signals representing appropriately duplicated rows or columns of each of the N by M matrix and the M by W matrix so as to combine them to produce N by W occurrences of interferences between each of row of the N by M matrix and the column of the M by W matrix containing multiplication results in N by W total interference intensities.

Also shown is a multiplication unit for tensor multiplication. A first optical multiplexer that receives a first optical signal representing a first tensor with rank p, where the shape of the first tensor is [N1, N2, . . . , Np−1, M].

A first encoder for encoding each element of the first tensor along the first rank to the pth rank to the first to the pth, and each element is encoded with optical modes as a floating point number that includes an exponent mapped to a frequency of light and an amplitude representing a significand of the one or more floating point numbers mapped onto a complex amplitude, respectively.

A second optical multiplexer that receives a second optical signal, coherent with the first optical signal, representing a second tensor with a rank q, the shape of the second tensor is [M, W1, . . . , Wq−1]. N1, N2, . . . , Np−1, M, W1, . . . , Wq−1, where p and q are each a positive integer greater or equal to one.

A first set of optical duplicators for reproducing the multiplexed optical signals representing the tensors into a plurality of W1×W2× . . . ×Wq−1 copies in the (p+1)th to the (p+q)th orthogonal degrees of freedom (DOF)/dimensions of light.

A second encoder for encoding each element of the second tensor along the first rank to the qth rank on to the (p)th to the (p+q−1)th, and each element is encoded with optical modes as a floating point number that includes an exponent mapped to a frequency of light and an amplitude representing a significand of the one or more floating point numbers mapped onto a complex amplitude, respectively, with an identical element light mapping as the duplicates of the (p+1)th to the (p+q)th of the first tensor.

A second set of optical duplicators for reproducing the multiplexed signals representing the second tensor into a plurality of N1×N2× . . . × Np−1 copies in the first to the (p−1)th, which are identical to the element-light mapping as the first to the (p−1)th of the first tensor.

At least one beam combiner that receives two sets of [N1, N2, . . . , Np−1, M, W1, . . . , Wq−1] multiplexed optical signals from the two sets of optical duplicators to combine them to produce [N1, N2, . . . , Np−1, W1, . . . , Wq−1] occurrences of interferences containing summation of the multiplication of N1×N2× . . . ×Np−1×W1× . . . ×Wq−1 distinct M-element vector-vector multiplications in interference intensities.

FPA Using RF/Microwave Subcarrier Modulation

Figure 9:
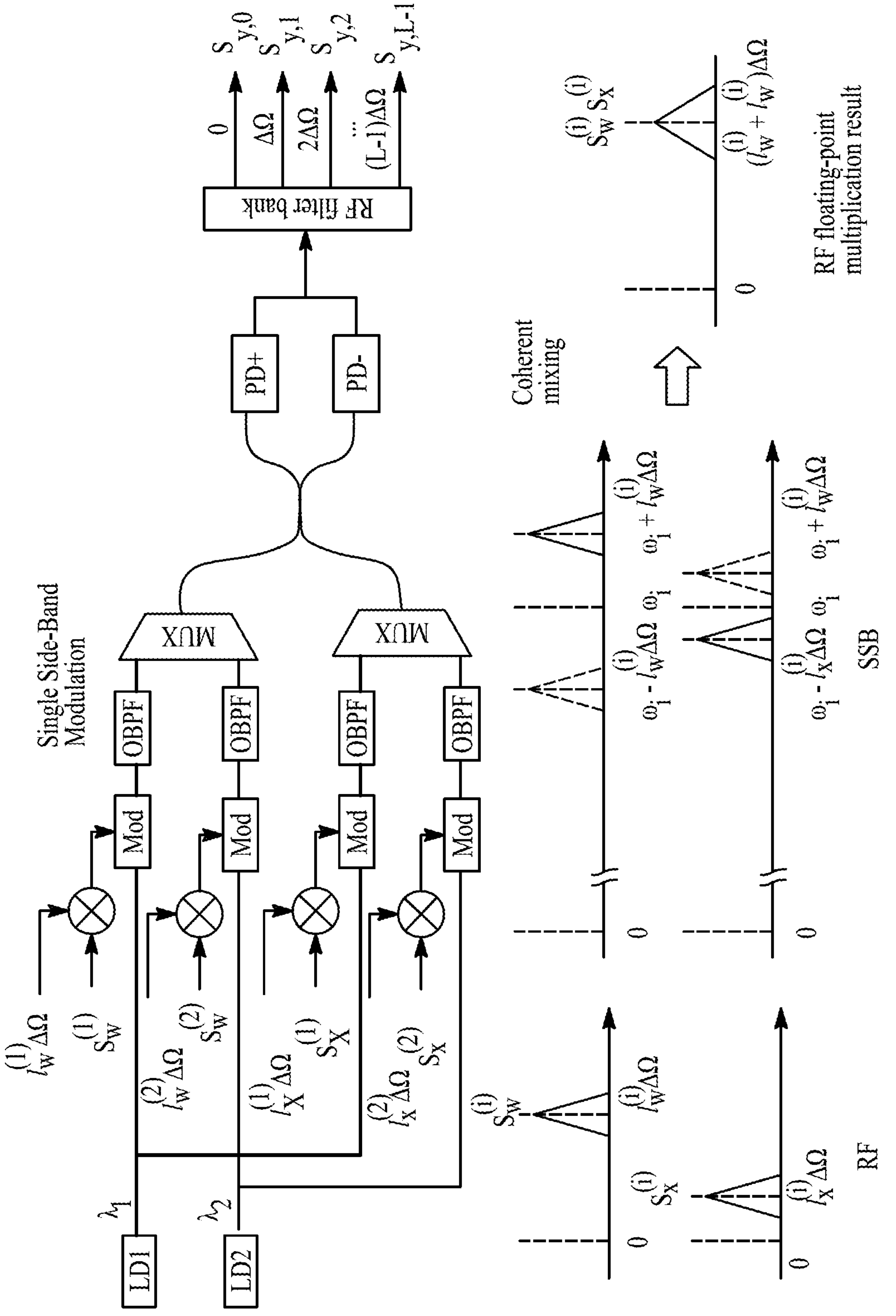
FIG. 9 is a diagram of 2×2 matrix-vector multiplication using RF modulation as subcarriers, according to one aspect of the present invention.

In addition to using comb lines from OFCs, RF/microwave subcarriers could also be implemented to encode the exponent levels. In this scheme, wavelength, as a degree of freedom, can be used for performing accumulation. The RF signals that encode two input vectors are expressed as:

$$\mathcal{E}_w(t) = \sum_{n=1}^{N} s_w^{(n)}(t)\cos\left(l_w^{(n)}\Delta\Omega\cdot t\right),\quad \mathcal{E}_x(t) = \sum_{n=1}^{N} s_x^{(n)}(t)\cos\left(l_x^{(n)}\Delta\Omega\cdot t\right) \tag{9}$$

where ΔΩ is the spacing between two adjacent RF/microwave carriers. Single-sideband modulation (SSB) using 1) optical band-pass filtering (shown in FIG. 9.) or 2) SSB modulator can be adopted for generating the RF-modulated optical signal to avoid redundant sideband interference terms from occupying the detection bandwidth, as shown in FIG. 9.

Similar to the case of introducing a sign difference for exponent encoding using OFC comb lines, the upper sideband (USB) is selected for the electric field $E_w(t)$ and the lower sideband (LSB) for the electric field $E_x(t)$, which are expressed as:

$$E_w(t) = \sum_{n=1}^{N} s_w^{(n)}(t)\exp\left(jl_w^{(n)}\Delta\Omega t\right)\exp(j\omega_n\tau).\quad E_x(t) = \sum_{n=1}^{N} s_x^{(n)}(t)\exp\left(-jl_x^{(n)}\Delta\Omega)t\right)\exp(j\omega_n\tau) \tag{10}$$

The wavelength is used for accumulation $\Psi_n(x, y, \tau)=\exp(j\omega_n\tau)$, where $\omega_n=2\pi c/\lambda_n$ is the angular frequency of the light, corresponding to the n-th WDM channel. Considering the orthogonality between the WDM channels, the interference signal from the balanced detector, $$I(t) \propto \sum_{n=1}^{N} s_w^{(n)}(t)s_x^{(n)}(t)\cos\left(\left(l_w^{(n)} + l_x^{(n)}\right)\Delta\Omega t\right). \tag{11}$$

The multiplication result of the significands at exponent level $$l_w^{(n)} + l_x^{(n)}$$

can be extracted from the RF bandpass filter with central frequency at $$\left(l_w^{(n)} + l_x^{(n)}\right)\Delta\Omega,$$

as shown in Eq.

$$I(t) \propto \sum_{n=1}^{N} s_w^{(n)}(t)s_x^{(n)}(t)\cos\left(\left(l_w^{(n)} + l_x^{(n)}\right)\Delta\Omega t\right) \tag{12}$$

FIG. 8 illustrates the setup for vector-vector multiplication between two 2-element vectors w and x. It is worth mentioning that if double sideband modulation (DSB) were used, an RF modulation bias $\Omega_0$ needs to be introduced to separate the frequencies generated from the summation of subcarriers $$2\Omega_0 + \left(l_w^{(n)} - l_x^{(n)}\right)\Delta\Omega.$$

The total number of RF exponent levels is $$L < \frac{\Omega_0}{\Delta\Omega} - \frac{1}{2}.$$

For a detection bandwidth of 32 GHz, if we set the bias frequency, $\Omega_0/2\pi$, to be 16 GHz, and the frequency increment to be $\Delta\Omega/2\pi=2$ GHZ, the maximum number of detection exponent levels is L=7. In comparison, SSB can support 16 carrier channels.

Renewed Research in Optics for ANN

The resurgence of artificial neural networks attracts research interest in power-efficient computing devices, especially in the analog computing paradigm. Recently, the field of optics for ANN is experiencing a resurgence after a relatively long dormant period, exemplified by the following representative work.

Analog in-Memory Computing

With recent progress in nanoelectronics, especially in new memory resistive (memristive) devices and other non-volatile memory (NVM) devices [31], [32], analog in-memory computing has gained renewed attention as a promising candidate to further reduce power dissipation and enhance the scalability [33], [34], [35]. A two-dimensional array of a memristor crossbar can carry out matrix-vector multiplication without the access of volatile memory (e.g., SRAM, DRAM), and therefore its potential as a more efficient computing paradigm for matrix multiplication in a neural network has been recognized long before the emergence of memristors [36], [37], [38]. However, scaling up to larger arrays (N>1000) the accumulated resistance and capacitance of the device require a long RC discharging time, limiting the computing speed of electronic in-memory computing.

Optical in-memory computing has a similar architecture to its electronic counterpart [39], [40]. The weight matrix is encoded in the 2D array of optical phase-change material (PCM) [41], [42], which determines the coupling between the horizontal waveguide array and the vertical array. The accumulation is performed in the wavelength domain. Compared to the electronic NVM crossbar, one major advantage of the photonic in-memory approach is its scalability in speed—the size of the array can be scaled up while the clock is maintained at high speed. However, the pitch of the photonic crossbar device is ~10 μm, which is more than 3 orders of magnitude larger than the pitch of the memristor crossbar. Also, for optical PCM, the writing process usually requires 1-2 orders of magnitude more energy than NVM, making it unfit for the neural network training process.

Both the NVM and optical PCM suffer from low precision, low dynamic range, element nonuniformity, slow update speed, and poor write operation repeatability. Though the randomness in the update process could help the convergence of the training under certain contexts, the trained models would not have the universality as those trained on digital processors, as the training process is device-specific.

Matrix-Vector Multiplication Based on Coherent Propagation

In this work [43], matrix-vector multiplication was performed by propagating an array of coherent input optical signals through a reconfigurable silicon photonic integrated circuit (PIC). As a result, the output optical signals become the products of the transfer matrix of the PIC and the input signals. It turns out that the transfer matrix of the silicon PIC can be set to any prescribed weight matrix. This is because any real-valued m×n matrix M may be decomposed as $M=U\Sigma V^{\dagger}$ through singular value decomposition (SVD), where U and V are m×m and n×n unitary matrices, respectively, and $\Sigma$ is an m×n real-valued rectangular diagonal matrix. It has also been shown theoretically that any unitary transformations can be implemented with optical beamsplitters and phase shifters [44], [45]. In Ref [43], the beamsplitters and phase shifters were realized in silicon waveguide MZ interferometers.

The beauty of this approach is that an integrated PIC performs both multiplication and accumulation for matrix-vector multiplication without actively consuming any power. In Ref [43], the PIC has 54 MZs occupying an area of about 1.2×0.5 cm. A 12" wafer thus can support about 60,500 MZs, or roughly 250 by 250 MZs. As will be shown in Section 5, our approach can be scaled to much larger sizes. As pointed out by the authors themselves in a new study [25], "the footprint of directional couplers and phase modulators makes scaling to large (n>1000) numbers of neurons very challenging."

Photoelectronic Matrix-vector Multiplication Based on Time-Division Multiplexing (TDM) with Extended Precision In this hybrid approach [25], vector-vector multiplication was executed by element-wise coherent optical mixing between a temporally-modulated signal and a temporally-modulated local oscillator (LO) in the time domain and accumulation was performed on the photo-detected signal by low-pass filtering, which is equivalent to integration. We have recently expanded this concept in a fiber-based system and demonstrated extended precision for matrix-vector multiplication. A setup demonstrating multiplication between a matrix and a vector on a time-division multiplexing (TDM) analog optical multiplier supporting signed 5-level inputs (−2 to 2, base $\beta=3$) has been implemented by Zhu et al., [46]. The analog multiplier is a fiber interferometer with a pair of balanced detectors that calculates the product of two numbers. The product is represented by the analog symbols with signed 9 levels (−4 to 4). Digital accumulation on FPGA sums up the products and outputs the element in the result vector Y.

The input matrix W and vector X contain signed 17 levels, which are beyond the native precision of the analog multiplier. We express W and X with L=2 exponent levels, i.e. $l_w$, $l_x\in\{0,1\}$, and feed the precision-decomposed W and X elements to the multiplier, shown in the sequences (c1) and (c2), respectively. The results contain 3 exponent levels ($l_y\in\{0,1,2\}$), which are individually read out and combined to produce the final output Y.

The analog multiplier has a native precision of 5 signed levels ($\beta=3$). The 9-level W and X are decomposed into 2 with exponents l=0 and l=1. The scheme of the TDM optical multiplier setup.

This approach effectively enhanced the dynamic range of analog computation. However, repeated updates of the ANN weight matrix are required in training processes, and this configuration always needs high-speed modulation, since accumulations are implemented using time-division multiplexing (TDM), resulting in excessive energy expenditure. This construction has a direct implication to its scalability. Let us assume that the integration time for accumulation is 200 ps, corresponding to a 5 GHz clock rate. Assuming a maximum modulation speed of 500 GHz, the number of weights per column is only 100. Our approach can be scaled to much larger sizes and encodes a greater number of exponent levels.

Non-Limiting Examples

Although specific embodiments of the invention have been discussed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

It should be noted that some features of the present invention may be used in one embodiment thereof without use of other features of the present invention. As such, the foregoing description should be considered as merely illustrative of the principles, teachings, examples, and exemplary embodiments of the present invention, and not a limitation thereof.

Also, these embodiments are only examples of the many advantageous uses of the innovative teachings herein. In general, statements made in the specification of the present application do not necessarily limit any of the various claimed inventions. Moreover, some statements may apply to some inventive features but not to others.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

INCORPORATED REFERENCES

The following publications are each incorporated by reference in their entirety:

INCORPORATED REFERENCES LISTED IN THE INFORMATION DISCLOSURE

[1] K. Jain and G. W. Pratt, "Optical transistor," *Appl. Phys. Lett.*, vol. 28, no. 12, pp. 719-721, June 1976, doi: 10.1063/1.88627.

[2] R. F. Rutz, "Transistor-Like Device Using Optical Coupling Between Diffused P-N Junctions in GaAs," *Proc. IEEE,* 1963, doi: 10.1109/PROC.1963.1854.

[3] M. N. Islam, "Ultrafast all-optical logic gates based on soliton trapping in fibers," *Opt. Lett.*, vol. 14, no. 22, p. 1257 November 1989, doi: 10.1364/OL.14.001257.

[4] H. F. Taylor, "Guided wave electrooptic devices for logic and computation," *Appl. Opt.*, vol. 17, no. 10, p. 1493 May 1978, doi: 10.1364/AO.17.001493.

[5] J. W. Goodman, "Operations Achievable with Coherent Optical Information Processing Systems," *Proc. IEEE,* 1977, doi: 10.1109/PROC.1977.10429.

[6] D. A. B. Miller, "Are optical transistors the logical next step?," *Nat. Photonics*, vol. 4, no. 1, pp. 3-5, January 2010, doi: 10.1038/nphoton.2009.240.

[7] H. J. Caulfield and S. Dolev, "Why future supercomputing requires optics," *Nat. Photonics*, vol. 4, no. 5, pp. 261-263, May 2010, doi: 10.1038/nphoton.2010.94.

[8] T. Deng, J. Robertson, and A. Hurtado, "Controlled Propagation of Spiking Dynamics in Vertical-Cavity Surface-Emitting Lasers: Towards Neuromorphic Photonic Networks," *IEEE J. Sel. Top. Quantum Electron.,* 2017, doi: 10.1109/JSTQE.2017.2685140.

[9] T. Ferreira de Lima, B. J. Shastri, A. N. Tait, M. A. Nahmias, and P. R. Prucnal, "Progress in neuromorphic photonics," *Nanophotonics,* 2017, doi: 10.1515/nanoph-2016-0139.

[10] D. Brunner, S. Reitzenstein, and I. Fischer, "All-optical neuromorphic computing in optical networks of semiconductor lasers," in 2016 *IEEE International Conference on Rebooting Computing* (ICRC), IEEE, October 2016, pp. 1-2. doi: 10.1109/ICRC.2016.7738705.

[11] J. K. George et al., "Neuromorphic photonics with electro-absorption modulators," *Opt. Express*, vol. 27, no. 4, p. 5181 February 2019, doi: 10.1364/OE.27.005181.

[12] H. T. Peng, M. A. Nahmias, T. F. De Lima, A. N. Tait, B. J. Shastri, and P. R. Prucnal, "Neuromorphic Photonic Integrated Circuits," *IEEE J. Sel. Top. Quantum Electron.,* 2018, doi: 10.1109/JSTQE.2018.2840448.

[13] A. M. Andrew, "Principles of Neuromorphic Photonics," in *Unconventional Computing. Encyclopedia of Complexity and Systems Science Series,* 2012. doi: 10.1108/03684921211229587.

[14] A. N. Tait et al., "Neuromorphic photonic networks using silicon photonic weight banks," *Sci. Rep.,* 2017, doi: 10.1038/s41598-017-07754-z.

[15] A. Dejonckheere et al., "All-optical reservoir computer based on saturation of absorption," *Opt. Express,* 2014, doi: 10.1364/oe.22.010868.

[16] F. Duport, B. Schneider, A. Smerieri, M. Haelterman, and S. Massar, "All-optical reservoir computing," *Opt. Express,* 2012, doi: 10.1364/oe.20.022783.

[17] A. Katumba, J. Heyvaert, B. Schneider, S. Uvin, J. Dambre, and P. Bienstman, "Low-Loss Photonic Reservoir Computing with Multimode Photonic Integrated Circuits," *Sci. Rep.,* 2018, doi: 10.1038/s41598-018-21011-x.

[18] K. Vandoorne et al., "Toward optical signal processing using Photonic Reservoir Computing," *Opt. Express*, vol. 16, no. 15, p. 11182, July 2008, doi: 10.1364/OE.16.011182.

[19] L. Larger, A. Baylon-Fuentes, R. Martinenghi, V. S. Udaltsov, Y. K. Chembo, and M. Jacquot, "High-speed photonic reservoir computing using a time-delay-based architecture: Million words per second classification," *Phys. Rev.* X, 2017, doi: 10.1103/PhysRevX.7.011015.

[20] Y. Paquot et al., "Optoelectronic reservoir computing," *Sci. Rep.,* 2012, doi: 10.1038/srep00287.

[21] N. P. Jouppi et al., "In-Datacenter Performance Analysis of a Tensor Processing Unit," in *Proceedings of the 44th Annual International Symposium on Computer Architecture—ISCA* '17, New York, New York, USA: ACM Press, 2017, pp. 1-12. doi: 10.1145/3079856.3080246.

[22] M. Courbariaux, Y. Bengio, and J. P. David, "Binaryconnect: Training deep neural networks with binary weights during propagations," in *Advances in Neural Information Processing Systems,* 2015, pp. 3123-3131.

[23] M. Rastegari, V. Ordoncz, J. Redmon, and A. Farhadi, "XNOR-Net: ImageNet Classification Using Binary Convolutional Neural Networks BT—Computer Vision—ECCV 2016," B. Leibe, J. Matas, N. Sebe, and M. Welling, Eds., Cham: Springer International Publishing, 2016, pp. 525-542.

[24] I. Hubara, M. Courbariaux, D. Soudry, R. El-Yaniv, and Y. Bengio, "Quantized neural networks: Training neural networks with low precision weights and activations," *J. Mach. Learn. Res.*, vol. 18, pp. 1-30, 2018.

[25] R. Hamerly, L. Bernstein, A. Sludds, M. Soljačić, and D. Englund, "Large-Scale Optical Neural Networks Based on Photoelectric Multiplication," *Phys. Rev.* X, vol. 9, no. 2, p. 021032, May 2019, doi: 10.1103/PhysRevX.9.021032.

[26] P. Merolla, R. Appuswamy, J. Arthur, S. K. Esser, and D. Modha, "Deep neural networks are robust to weight binarization and other non-linear distortions," 2016, [Online]. Available: http://arxiv.org/abs/1606.01981

[27] S. Zhou, Y. Wu, Z. Ni, X. Zhou, H. Wen, and Y. Zou, "DoReFa-Net: Training Low Bitwidth Convolutional Neural Networks with Low Bitwidth Gradients," vol. 1, no. 1, pp. 1-13, 2016, [Online]. Available: http://arxiv.org/abs/1606.06160

[28] N. Mellempudi, A. Kundu, D. Mudigere, D. Das, B. Kaul, and P. Dubey, "Ternary Neural Networks with Fine-Grained Quantization," *arXiv Prepr. arXiv*1705.01462, May 2017.

[29] S. Gupta, A. Agrawal, K. Gopalakrishnan, and P. Narayanan, "Deep Learning with Limited Numerical Precision," 32*nd Int. Conf. Mach. Learn. ICML* 2015, vol. 3, pp. 1737-1746 February 2015, [Online]. Available: http://arxiv.org/abs/1502.02551

[30] Y. Wang, N. Zhao, Z. Yang, Z. Zhang, B. Huang, and G. Li, "Few-mode SDM receivers exploiting parallelism of free space," *IEEE Photonics Journal,* 2019. doi: 10.1109/JPHOT.2019.2896645.

[31] D. B. Strukov, G. S. Snider, D. R. Stewart, and R. S. Williams, "The missing memristor found," *Nature*, vol. 453, no. 7191, pp. 80-83, May 2008, doi: 10.1038/nature06932.

[32] L. Chua, "Resistance switching memories are memristors," *Appl. Phys. A*, vol. 102, no. 4, pp. 765-783, March 2011, doi: 10.1007/s00339-011-6264-9.

[33] J. J. Yang, D. B. Strukov, and D. R. Stewart, "Memristive devices for computing," *Nat. Nanotechnol.*, vol. 8, no. 1, pp. 13-24, 2013, doi: 10.1038/nnano.2012.240.

[34] T. Gokmen and Y. Vlasov, "Acceleration of Deep Neural Network Training with Resistive Cross-Point Devices: Design Considerations," *Front. Neurosci.*, vol. 10, July 2016, doi: 10.3389/fnins.2016.00333.

[35] C. Li et al., "Analogue signal and image processing with large memristor crossbars," *Nat. Electron.*, vol. 1, no. 1, pp. 52-59, January 2018, doi: 10.1038/s41928-017-0002-z.

[36] A. H. Kramer, "Array-based analog computation," *IEEE Micro*, vol. 16, no. 5, pp. 20-29, 1996, doi: 10.1109/40.540077.

[37] C. Lehmann, M. Viredaz, and F. Blayo, "A generic systolic array building block for neural networks with on-chip learning," *IEEE Trans. Neural Networks*, vol. 4, no. 3, pp. 400-407, May 1993, doi: 10.1109/72.217181.

[38] K. Steinbuch, "Die Lernmatrix," *Kybernetic*, vol. 1, no. 1, pp. 36-45, 1961.

[39] J. Feldmann et al., "Parallel convolutional processing using an integrated photonic tensor core," *Nature*, vol. 589, no. 7840, pp. 52-58, January 2021, doi: 10.1038/s41586-020-03070-1.

[40] J. Feldmann, N. Youngblood, C. D. Wright, H. Bhaskaran, and W. H. P. Pernice, "All-optical spiking neurosynaptic networks with self-learning capabilities," *Nature*, vol. 569, no. 7755, pp. 208-214, 2019, doi: 10.1038/s41586-019-1157-8.

[41] C. Ríos et al., "In-memory computing on a photonic platform," *Sci. Adv.*, vol. 5, no. 2, p. eaau5759, February 2019, doi: 10.1126/sciadv.aau5759.

[42] C. Rios et al., "Integrated all-photonic non-volatile multi-level memory," *Nat. Photonics*, vol. 9, no. 11, pp. 725-732, 2015, doi: 10.1038/nphoton.2015.182.

[43] Y. Shen et al., "Deep learning with coherent nanophotonic circuits," *Nat. Photonics*, vol. 11, no. 7, pp. 441-446, July 2017, doi: 10.1038/nphoton.2017.93.

[44] J. Carolan et al., "Universal linear optics," *Science* (80-.)., 2015, doi: 10.1126/science.aab3642.

[45] M. Reck, A. Zeilinger, H. J. Bernstein, and P. Bertani, "Experimental realization of any discrete unitary operator," *Phys. Rev. Lett.,* 1994, doi: 10.1103/PhysRevLett.73.58.

[46] Z. Zhu, A. Fardoost, F. G. Vanani, A. B. Klein, G. Li, and S. S. Pang, "Coherent General-Purpose Photonic Matrix Processor," *ACS Photonics*, vol. 11, no. 3, pp. 1189-1196 March 2024, doi: 10.1021/acsphotonics.3c01694.

What is claimed is:

1. A floating point number multiplication unit comprising:

a first wave modulator that receives a first signal representing an exponent of a first floating point number mapped onto a frequency of a first harmonic wave and a second signal representing a significand of the first floating point number mapped onto an amplitude of the first harmonic wave to produce a first floating point number, representing a first factor in a multiplication;

a second wave modulator that receives a third signal representing an exponent of a second floating point number mapped onto a frequency of a second harmonic wave and a fourth signal representing a significand of the second floating point number mapped onto an amplitude of the second harmonic wave to produce a second floating point number representing a second factor in a multiplication; and a series arrangement in which the first wave modulator and the second wave modulator are connected in succession as a first stage and a second stage to produce a multiplication product of the first factor and the second factor.

2. The floating point number multiplication unit of claim 1, where either the first or second factor is unity, to produce a single floating point number with an exponent of a floating point number mapped onto a frequency of a harmonic wave; and a significand of the floating point number mapped onto an amplitude of the harmonic wave to produce a floating point number.

3. The floating point number multiplication unit of claim 1, wherein the first wave modulator and the second wave modulator are one of a sound wave modulator, an electromagnetic wave modulator, or an optical wave modulator.

4. The floating point number multiplication unit of claim 1, wherein an exponent is represented by a line in a frequency comb.

5. A floating point number vector multiplication unit comprising:

a first vector for multiplication based on a first wave modulator that receives a first signal representing an exponent of a first floating point number mapped onto a frequency of a first harmonic wave and a second signal representing a significand of the first floating point number mapped onto an amplitude of the first harmonic wave to produce a first floating point number, representing a first factor in a multiplication;

a second wave modulator that receives a third signal representing an exponent of a second floating point number mapped onto a frequency of a second harmonic wave and a fourth signal representing a significand of the second floating point number mapped onto an amplitude of the second harmonic wave to produce a second floating point number representing a second factor in a multiplication;

a series arrangement in which the first wave modulator and the second wave modulator are connected in succession as a first stage and a second stage, with the first factor in the multiplication is combined with the third signal to produce a multiplication product of the first factor and the second factor;

a second vector for multiplication based on a third wave modulator that receives a fifth signal representing an exponent of a third floating point number mapped onto a frequency of a third harmonic wave and a sixth signal representing a significand of the third floating point number mapped onto an amplitude of the third harmonic wave to produce a third floating point number, representing a third factor in a multiplication;

a fourth wave modulator that receives a seventh signal representing an exponent of a fourth floating point number mapped onto a frequency of a fourth harmonic wave and a fourth signal representing a significand of the fourth floating point number mapped onto an amplitude of the fourth harmonic wave to produce a fourth floating point number representing a fourth factor in a multiplication; and a series arrangement in which the third wave modulator and the fourth wave modulator are connected in succession as a third stage and a fourth stage, with the third factor in the multiplication is combined with the seventh signal to produce a multiplication product of third factor and the fourth factor; and a summation unit that sums the multiplication product of first factor and the second factor with the multiplication product of third factor and the fourth factor to produce a multiplication of the first vector with the second vector.

6. The floating point number vector multiplication unit of claim 5, wherein the first wave modulator and the second wave modulator are one of a sound wave modulator, an electromagnetic wave modulator, or an optical wave modulator.

7. The floating point number vector multiplication unit of claim 5, wherein the first wave modulator and the second wave modulator are one of an analog modulator or a digital modulator.

* * * * *